US010834600B2

(12) United States Patent
Tam et al.

(10) Patent No.: US 10,834,600 B2
(45) Date of Patent: Nov. 10, 2020

(54) MANAGING MOVING WIRELESS ACCESS POINTS IN WIRELESS NETWORK POSITIONING SYSTEM

(71) Applicant: Apple Inc., Cupertino, CA (US)

(72) Inventors: Margaret H. Tam, Mountain View, CA (US); David Benjamin Millman, Mountain View, CA (US); Brian Stephen Smith, Campbell, CA (US); Benjamin A. Detwiler, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/713,493

(22) Filed: Sep. 22, 2017

(65) Prior Publication Data
US 2018/0338245 A1    Nov. 22, 2018

Related U.S. Application Data

(60) Provisional application No. 62/509,562, filed on May 22, 2017.

(51) Int. Cl.
| H04W 16/08 | (2009.01) |
| H04W 28/08 | (2009.01) |
| H04W 16/24 | (2009.01) |
| H04W 16/14 | (2009.01) |
| H04W 64/00 | (2009.01) |
| H04W 24/04 | (2009.01) |
| H04W 84/00 | (2009.01) |

(Continued)

(52) U.S. Cl.
CPC .......... *H04W 16/14* (2013.01); *H04W 24/04* (2013.01); *H04W 64/003* (2013.01); *H04L 61/6022* (2013.01); *H04W 84/005* (2013.01); *H04W 88/08* (2013.01)

(58) Field of Classification Search
CPC ...................... H04W 4/00–04; H04W 4/30–38
See application file for complete search history.

(56) References Cited

U.S. PATENT DOCUMENTS

| 7,565,346 | B2 * | 7/2009 | Fan ...................... G06K 9/6215 |
| 8,619,643 | B2 | 12/2013 | Alizadeh-Shabdiz et al. |
| 9,408,178 | B2 | 8/2016 | Mayor et al. |

(Continued)

FOREIGN PATENT DOCUMENTS

CN    104427610    3/2015

*Primary Examiner* — San Htun
(74) *Attorney, Agent, or Firm* — Jaffery Watson Mendonsa & Hamilton LLP

(57) ABSTRACT

An example method includes obtaining a plurality of data items. Each data item includes an indication of a particular location, an indication that a wireless signal from a first access point was observed at that location, and an indication of a time at which the wireless signal from the first access point was observed at that location. The method also includes determining a locational stability of the first access point based on the data items. Determining the locational stability of the first access point includes clustering the plurality of data items into one or more clusters based on the locations indicated in the plurality of data items, determining whether the N most recent data items are associated with a common cluster, and determining whether a time span between the N most recent data items exceeds a threshold period of time.

37 Claims, 19 Drawing Sheets

(51) Int. Cl.
     *H04L 29/12*      (2006.01)
     *H04W 88/08*      (2009.01)

(56) References Cited

U.S. PATENT DOCUMENTS

| | | | |
|---|---|---|---|
| 9,521,645 B1 | 12/2016 | Zhao et al. | |
| 2005/0235237 A1* | 10/2005 | Alpert | G06F 17/5072 |
| | | | 716/111 |
| 2008/0069008 A1* | 3/2008 | Park | H04W 64/00 |
| | | | 370/254 |
| 2010/0074133 A1* | 3/2010 | Kim | G01S 5/0289 |
| | | | 370/252 |
| 2011/0176523 A1* | 7/2011 | Huang | G01S 5/02 |
| | | | 370/338 |
| 2011/0235623 A1* | 9/2011 | Alizadeh-Shabdiz | |
| | | | G01S 5/0278 |
| | | | 370/338 |
| 2013/0262465 A1* | 10/2013 | Galle | G06F 17/30 |
| | | | 707/737 |
| 2014/0211691 A1* | 7/2014 | Emadzadeh | H04W 64/00 |
| | | | 370/328 |
| 2015/0346313 A1 | 12/2015 | Smith | |
| 2015/0350841 A1* | 12/2015 | Dal Santo | H04W 4/029 |
| | | | 455/456.3 |
| 2015/0358882 A1* | 12/2015 | Liu | H04W 36/18 |
| | | | 370/331 |
| 2016/0321351 A1* | 11/2016 | Mor | G06F 17/30241 |

\* cited by examiner

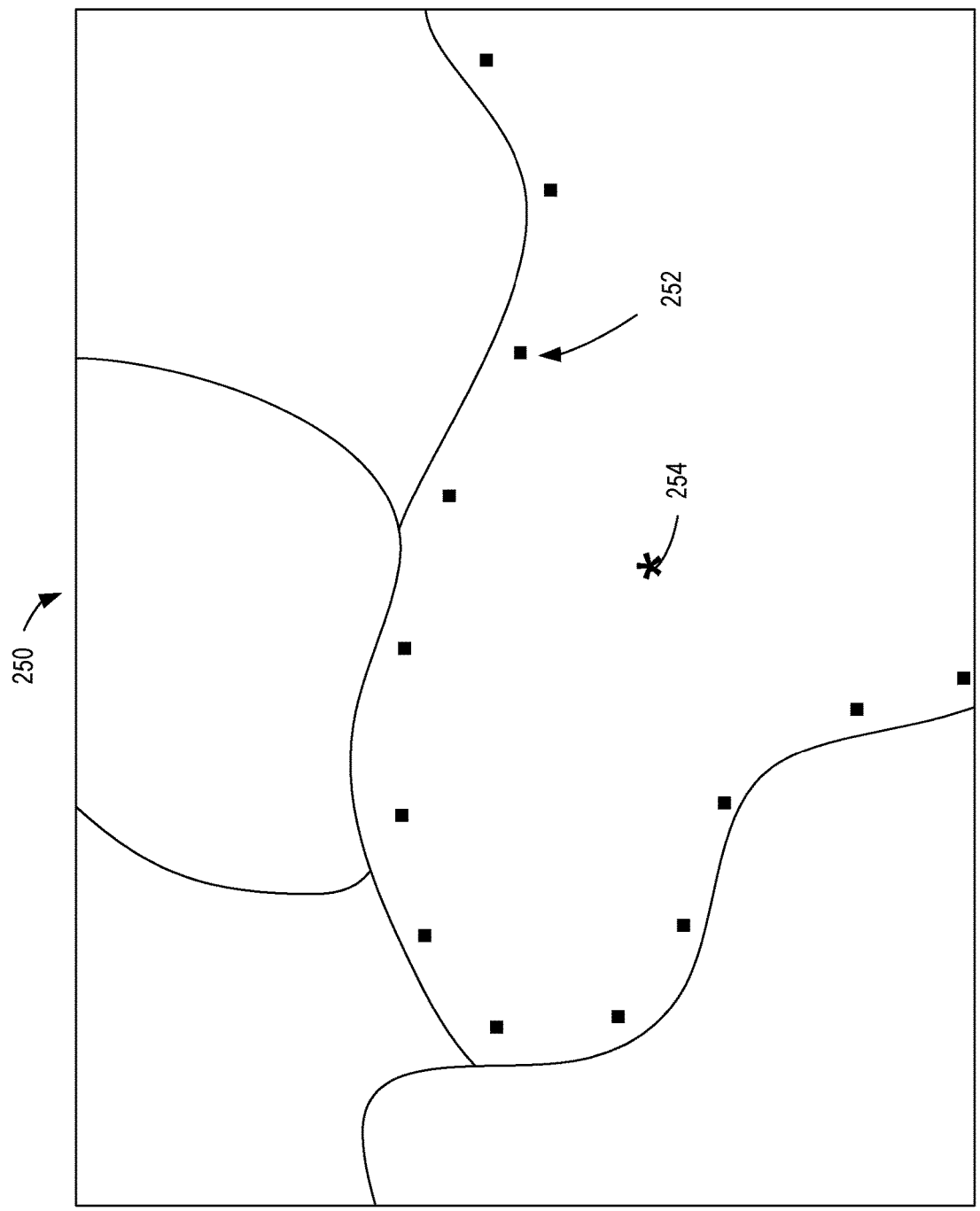

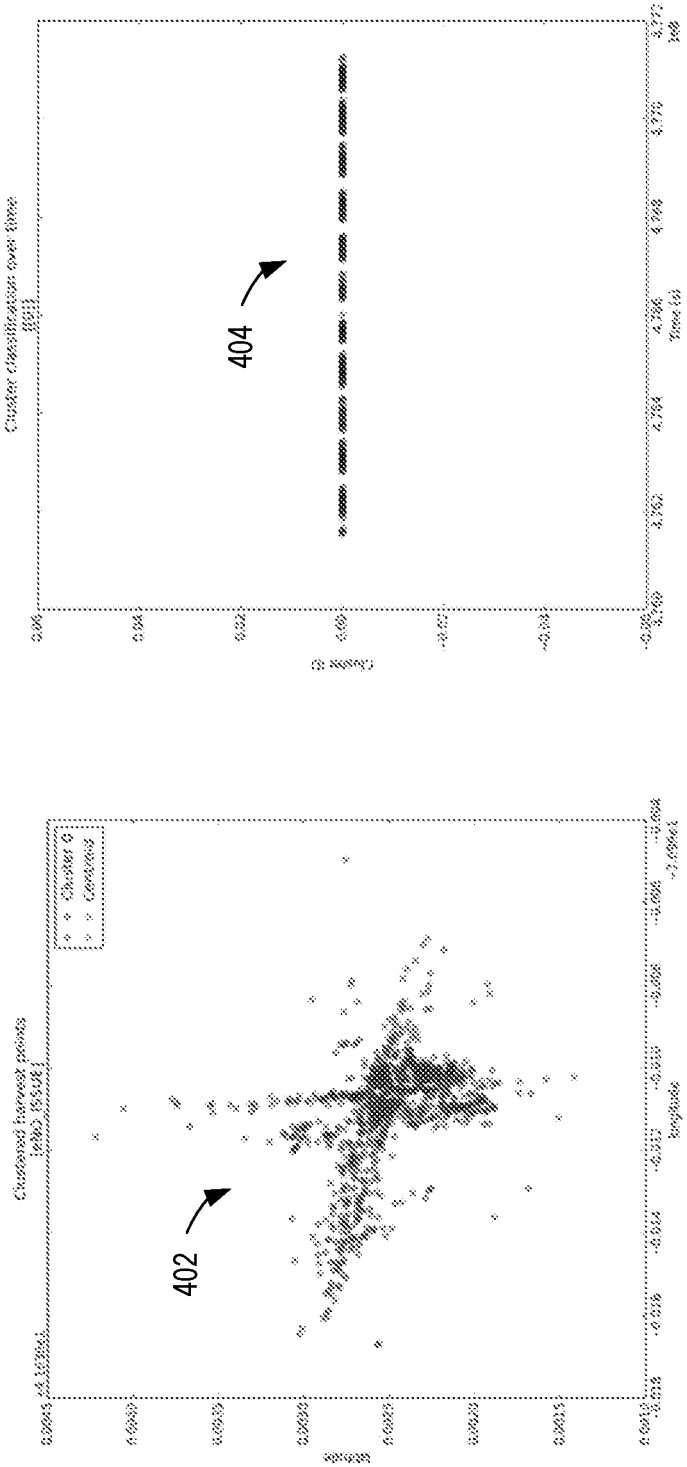

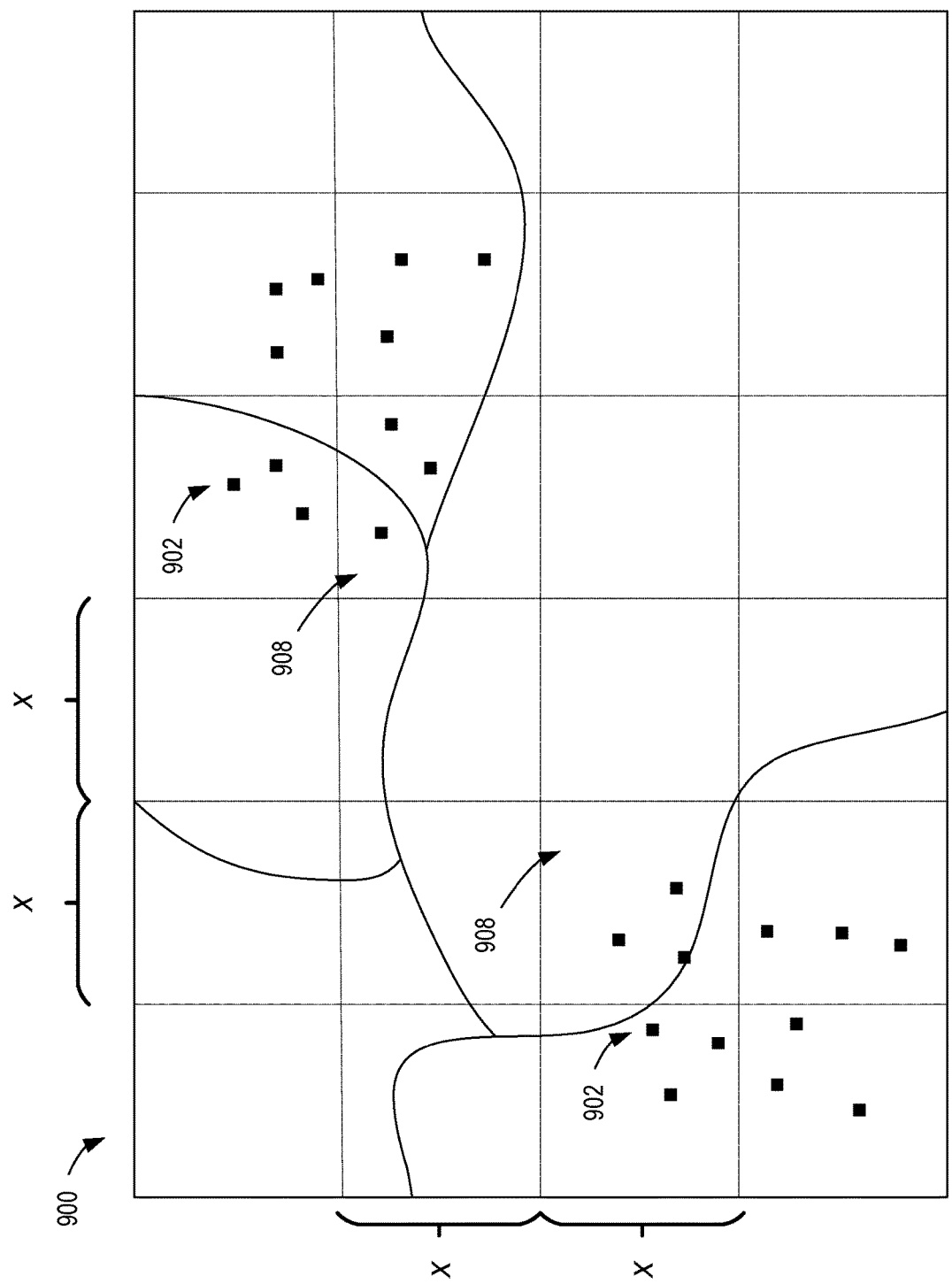

MANAGING MOVING WIRELESS ACCESS POINTS IN WIRELESS NETWORK POSITIONING SYSTEM

CROSS-REFERENCE TO RELATED APPLICATION

This application claims priority to U.S. Provisional Application No. 62/509,562, filed May 22, 2017, the entire contents of which are incorporated herein by reference.

TECHNICAL FIELD

The disclosure relates to wireless positioning systems.

BACKGROUND

Wireless access points are networking devices that enable one or more client devices to access a communications network. As an example, a wireless access point can transmit wireless signals to a client device (e.g., to relay communications from a network to the client device) and/or receive wireless signals from a client device (e.g., to relay communications from the client device to the network).

In some cases, a wireless access point can be positioned permanently or substantially permanently at a particular physical location (e.g., to provide network connectivity for a fixed area). In some cases, a wireless access point can be repositioned (e.g., to provide network connectivity for a different area). In some cases, a wireless access point can be repositioned repeatedly over a period of time (e.g., mounted onto a vehicle to provide mobile network connectivity).

SUMMARY

Systems, methods, devices and non-transitory, computer-readable mediums are disclosed for managing moving wireless access points in a wireless network positioning system.

In an aspect, a method includes obtaining, at a computing device, a plurality of data items. Each data item includes an indication of a particular location, an indication that a wireless signal from a first access point was observed at that location, and an indication of a time at which the wireless signal from the first access point was observed at that location. The method also includes determining, using the computing device, a locational stability of the first access point based on the data items. Determining the locational stability of the first access point includes clustering the plurality of data items into one or more clusters based on the locations indicated in the plurality of data items, determining whether the N most recent data items are associated with a common cluster, and determining whether a time span between the N most recent data items exceeds a threshold period of time.

Implementations can include one or more of the following features.

In some implementations, the method can further include determining, using the computing device, that the first access point is stable, and receiving, from a mobile device, a request for a location of the mobile device. The request can include an indication that a wireless signal from the first access point was observed by the mobile device. The method can also include, responsive to the request and upon determining that the first access point is stable, providing, to the mobile device, a location of the common cluster as the location of the mobile device.

In some implementations, the method can further include determining, using the computing device, that the first access point is unstable, and receiving, from a mobile device, a request for a location of the mobile device. The request can include an indication that a wireless signal from the first access point was observed by the mobile device. The method can also include, upon determining that the first access point is unstable, withholding a location of the first access point from the mobile device.

In some implementations, determining the locational stability of the first access point can further include determining that the N most recent data items are associated with the common cluster and that the time span between the N most recent data items exceeds the threshold period of time. Responsive to determining that the N most recent data items are associated with the common cluster and that the time span between the N most recent data items exceeds the threshold period of time, a determination can be made that the first access point is stable. N can be determined based on an access point density of a geographical region of the first access point. The threshold period of time can be determined based on an access point density of a geographical region of the first access point. At least one of N or the threshold period of time can be determined based on a frequently at which the wireless access point has been observed, or a number of times that the wireless access point has moved in the past.

In some implementations, determining the locational stability of the first access point can further include determining that the N most recent data items are not associated with a common cluster and/or that the time span between the N most recent data items does not exceed the threshold period of time. Responsive to determining that the N most recent data items are not associated with a common cluster and/or that the time span between the N most recent data items does not exceed the threshold period of time, a determination can be made that the first access point is unstable.

In some implementations, the method can further include merging two or more clusters. Merging two or more clusters can include determining that a time span associated with the data items of a first cluster overlaps with a time span associated with the data items of a second cluster, and determining that a distance between a center of the first cluster and a center of the second cluster is less than a threshold distance. Responsive to determining that the time span associated with the data items of the first cluster overlap with the time span associated with the data items of the second cluster and determining that the distance between the center of the first cluster and the center of the second cluster is less than the threshold distance, the first cluster and the second cluster are merged. The threshold distance can be determined based on a maximum reach of the first cluster. The first cluster can be associated with a greater number of data items than the second cluster.

In some implementations, the method can further include filtering the plurality of data items.

In some cases, clustering the plurality of data items into one or more clusters can include performing a density-based spatial clustering of applications with noise (DBSCAN) process with respect to at least a subset of data items of the plurality of data items.

In some implementations, clustering the plurality of data items into one or more clusters can include performing a DBSCAN process with respect to a subset of data items of the plurality of data items. The subset of data items can be selected by binning each of the data items with respect to a binned geographical grid, and selecting, as the subset of data items, a pre-defined number of data items from each bin of the binned graphical grid.

In some implementations, each data item can include a media access control (MAC) address of the first access point.

Other implementations are directed to systems, devices and non-transitory, computer-readable mediums.

Particular implementations provide at least the following advantages. In some cases, the implementations described herein can be used to determine the location of a mobile device based on observations of wireless signals from nearby wireless access points. This enables a mobile device to determine its location either without the use of a satellite-based location system, or in conjunction with a satellite-based location system. Thus, a mobile device's location can be determined more easily and/or more accurately. Further, in some cases, the implementations described herein can be used to account for the movement of wireless access points in an environment, and provide location estimates based on those movements. Thus, a mobile device is less likely to receive inaccurate location estimates (e.g., estimates based on observations of an unstable wireless access point).

The details of one or more embodiments are set forth in the accompanying drawings and the description below. Other features and advantages will be apparent from the description and drawings, and from the claims.

DESCRIPTION OF DRAWINGS

FIG. 2B is a diagram showing another example process for determining a location of a mobile device.

FIGS. 4A, 4B, 5A, 5B, 6A, 6B, 7A, and 7B show example results of the processes described herein.

FIG. 9A-9D are diagrams showing an example process for clustering points.

DETAILED DESCRIPTION

Overview

Figure 1:
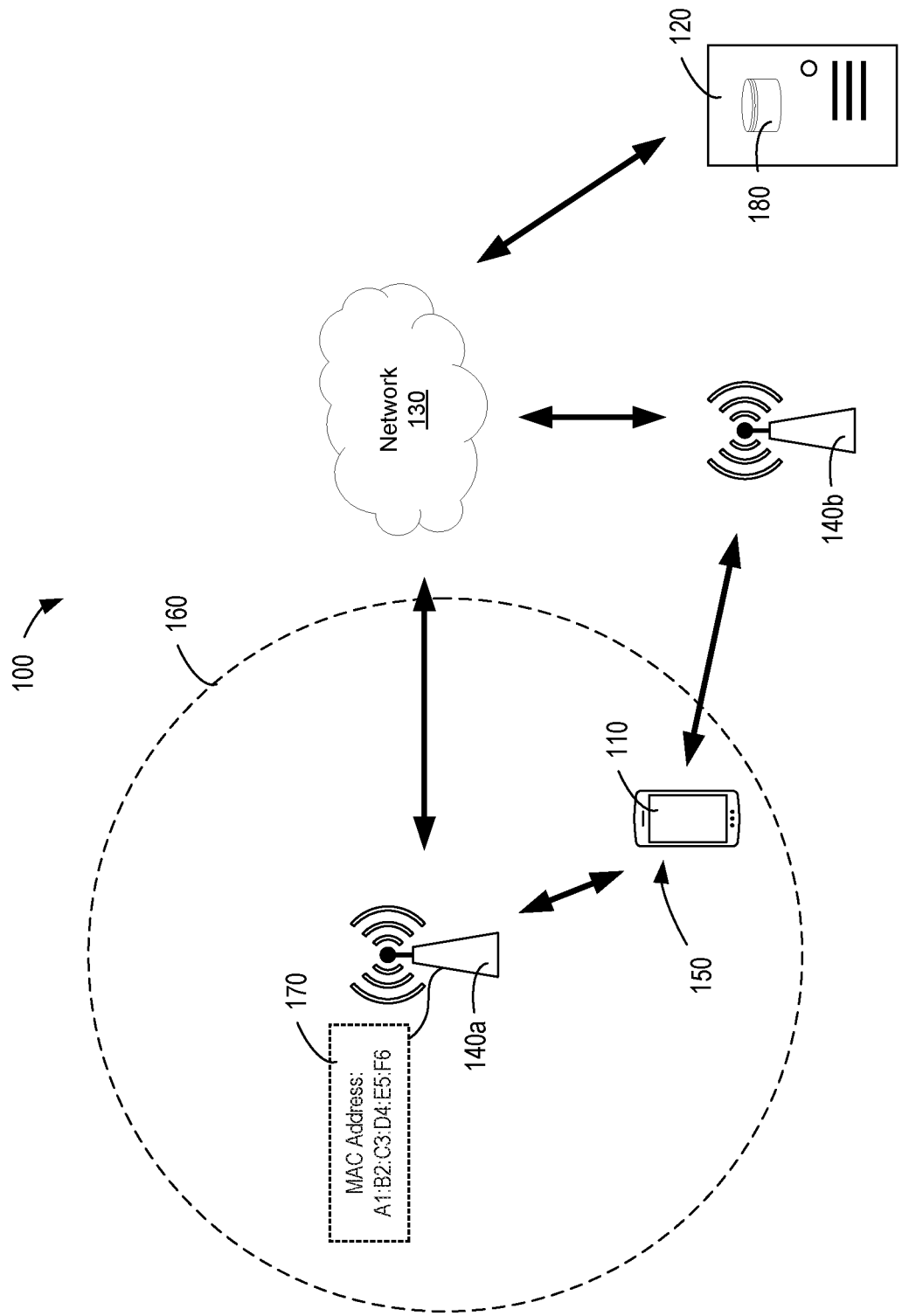
FIG. 1 is a block diagram of an example system for determining a location of a mobile device.

FIG. 1 is a block diagram of an example system 100 for determining a location of a mobile device. In some cases, the system 100 enables a mobile device to determine its location, either without the use of a satellite-based location system (e.g., the Global Positioning System [GPS]) or in conjunction with a satellite-based location system (e.g., to supplement or corroborate location information obtained from a satellite-based location system).

The system 100 includes a mobile device 110, a location server 120, and a network 130. The mobile device 110 can be any portable electronic device that is used by a user to view, process, transmit and receive data. Examples of a mobile computing device 110 include cellular phones, smartphones, wearable devices (e.g., smart watches), tablets, personal data assistants, notebook computers, and other portable computing devices capable of transmitting and receiving data via a network 130. The mobile computing devices 110 can include wireless transceivers to communicate with wireless access points associated with the network 130. The mobile computing device 110 can include devices that operate using one or more operating systems (e.g., Apple iOS, Apple OSX, Apple watchOS, Unix, Linux, etc.) and/or architectures (e.g., ARM, PowerPC, x86, etc.)

The location server 120 is communicatively connected to the mobile device 110 through the network 130. The location server 120 is configured to receive data from the mobile device 110, estimate the location of the mobile device 110 based on the received data, and transmit the estimated location to the mobile device 110. In some cases, the location server 120 can estimate the location of a mobile device 110 based on information regarding wireless signals observed by the mobile device 110 (e.g., wireless signals from one or more wireless access points observed by the mobile device 110, such as the wireless access points 140a and 140b).

The location server 120 can be any electronic device that receives, processes, and transmits data. Examples of a location server 120 include server computers, distributed computing networks, or other systems capable of transmitting and receiving data via a network 130. A location server 120 also can include devices that operate using one or more operating systems and/or architectures.

The location server 120 is illustrated as a single component. However, in practice, it can be implemented on one or more computing devices. The location server 120 can be, for instance, a single computing device that is connected to the network 130, or multiple computing devices that are connected to the network 130. In some implementations, the location server 120 need not be located locally to the rest of the system 100, and portions of or the entirety of the location server 120 can be located in one or more remote physical locations.

The network 130 can be any communications network through which data can be transferred and shared. For example, the network 130 can be a local area network (LAN) or a wide-area network (WAN), such as the Internet. The network 130 can be implemented using various networking interfaces, for instance wireless networking interfaces (such as Wi-Fi, Bluetooth, or infrared) or wired networking interfaces (such as Ethernet or serial connections). The network 130 also can include combinations of more than one network, and can be implemented using one or more networking interfaces.

In an example usage of the system 100, the mobile device 110 communicates with the location server 120 to determine its location. As shown in FIG. 1, the mobile device 110 is positioned at a location 150. At this location 150, the mobile device 110 is within communication range of a wireless access point 140a (denoted by dotted circle 160), and can observe wireless signals transmitted from the wireless access point 140a (e.g., through a wireless transceiver). The mobile device 110 can, for example, conduct one or more wireless surveys to probe the area for the presence of wireless access points. For example, the mobile device 110 can continuously, periodically, or intermittently search for wireless signals transmitted using one or more frequency bands designated for wireless communications.

Wireless access points 140a and 140b are networking devices that enable one or more client devices to access a communications network. As an example, a wireless access point can transmit wireless signals to a client device and/or receive wireless signals from a client device. Examples of wireless access points include Wi-Fi access points, cellular network access points, or other devices that transmit and/or receive information over a wireless network. Wi-Fi access points can include, for example, access points that operate according to the Institute of Electrical and Electronics Engineers (IEEE) 802.11 standards, or according to other standards. Cellular network access points can include, for example, global system for mobile communications (GSM) access points, code-division multiple access (CDMA) access points, or other access points configured to wirelessly communicate with devices over a cellular network.

As an example, the wireless access point 140a can be a Wi-Fi access point, and the mobile device 110 can conduct wireless surveys to identify Wi-Fi communications signals transmitted by the wireless access point 140a. As another example, the wireless access point 140a can be a cellular network access point, and the mobile device 110 can conduct wireless surveys to identify cellular network communications signals transmitted by the wireless access point 140a.

The mobile device 110 identifies the wireless access point 140a based on the observed wireless signals. For instance, the wireless signals broadcast by the wireless access point 140a can include identifying information 170 regarding the wireless access point 140a. As an example, the wireless signals can include an indication of a media access control (MAC) address associated with the wireless access point 140a. As another example, the wireless signals can include an indication of a cell ID (CID) associated with the wireless access point 140a. Other identifiers that distinguish the wireless access point 140a from other wireless access points are also possible.

The mobile device 110 transmits the identifying information 170 to the location server 120 through the network 130. In some cases, the mobile device 110 can transmit the identifying information 170 through the wireless access point 140a (e.g., by transmitting the identifying information 170 to the wireless access point 140a, which in turn relays the identifying information 170 to the location server 120 through the network 130).

In some cases, the mobile device 110 can transmit the identifying information 170 through another wireless access point. For example, the mobile device 110 can transmit the identifying information 170 to another wireless access point 140b, which in turn relays the identifying information 170 to the location server 120 through the network 130. As an example, the mobile device 110 might not have access to wireless access point 140a, but might have access to wireless access point 140b. For example, the wireless access point 140a can be a restricted Wi-Fi access point maintained by a third-party, and the wireless access point 140b can be a cellular network access point associated with a communications service to which the user of the mobile device 110 subscribes. Thus, the mobile device can transmit the identifying information 170 associated with the wireless access point 140a through the wireless access point 140b.

The location server 120 estimates the location of the mobile device 110 based on the received identifying information 170. In some cases, the location server 120 can include a database 180 with one or more access point records. Each access point record includes a particular wireless access point identifier, and one or more locations associated with that identifier. For example, each access point record can include a MAC address or CID that identifies a specific wireless access point, and geographical coordinates identifying the location of the wireless access point, such as a latitude and longitude pair. Based on the identifying information 170, the location server can retrieve the access point record corresponding to the wireless access point 140a, and determine a location associated with the wireless access point 140a.

The location server 120 transmits the determined location to the mobile device 110. This location represents an estimated location of the mobile device 110. For example, because the mobile device 110 is in relative proximity to the wireless access point 140a (e.g., within the communications range of the wireless access point 140a), the location of the wireless access point 140a approximates the location of the mobile device 110. In turn, the mobile device 110 can use this estimated location to execute location-dependent functions. For example, the mobile device 110 can render a map for a user with an indication of the user's current location, retrieve content relevant to the user's current location, record the user's current location, share the user's current location with others, or perform other location-dependent functions. In some cases, the mobile device 110 can use the estimated location in conjunction with location information obtained from one or more additional sources, such that the user's current location can be more accurately determined. For example, the estimated location can be used to supplement or corroborate location information obtained through a satellite-based location system.

Although FIG. 1 depicts location estimation based the observation of a single wireless access point, this is merely an illustrative example. In practice, a location estimate can be based on the observation of multiple wireless access points. For example, a mobile device can observe multiple different wireless access points, and transmit information regarding each of those wireless access points to a location server. In response, the location server can retrieve location information for each of the observed wireless access points, and provide one or more estimated locations based on the retrieved information. In some cases, if location information regarding multiple observed wireless access points is available, the location server and/or the mobile device can determine a single estimated location based on the information. For example, the location server and/or the mobile device can calculate a single estimated location that is consistent with some or all of the observations.

In some cases, the location server 120 can update access point records in the database 180 based on recorded observations received from one or more mobile devices. For example, each of several mobile devices (e.g., the mobile device 110 and other mobile devices) can conduct one or more wireless surveys to probe the area for the presence of wireless access points. For example, each of the mobile device 110 and/or other mobile devices can continuously, periodically, or intermittently search for wireless signals transmitted using one or more frequency bands designated for wireless communication. If a mobile device observes a wireless access point (e.g., detects wireless signals transmitted from a wireless access point), the mobile device can transmit a data item reflecting the recorded observation to the location server 120. The data item can include an identifier associated with the observed wireless access point (e.g., a MAC address or CID), and a timestamp indicating the time at which the wireless access point was observed. In addition, if the location of the mobile device is known (e.g., using the system described herein and/or using another system, such as a satellite-based location system), the data item can also include the location of the mobile device.

Based on the received data items, the location server 120 can determine that a particular wireless access point (e.g., having the received wireless access point identifier) was observed at a particular time, and at a particular location.

The location server 120 can update the database 180, such that it reflects the recorded observation. This can be useful, for example, in discovering new access points not previously included in the database 180 and/or to update the location of a previously observed wireless access point. For instance, the database can be updated to reflect that a new wireless access point has been deployed, or to reflect that a particular wireless access point has moved. Further, the location server 120 can collect a large number of recorded observations, and populate the database 180 with information regarding a large number of different wireless access points.

In some cases, the location server 120 can retain a subset of the recorded observations received from the mobile devices. This can be useful, for example, in reducing the storage and/or computational resources required to store and/or analyze the recorded observations. As an example, the location server 120 can retain, for each wireless access point, a pre-determined number of recorded observations. For instance, for each unique wireless access point identifier, the location server 120 can retain 10, 100, or 1000 recorded observations, or some other number of recorded observations. As another example, the location server 120 can retain, for each wireless access point, a pre-determined number of recorded observations over recurring periods of time. For instance, for each unique wireless access point identifier, the location server 120 can retain 10 samples every hour, 100 samples every day, or some other number of samples over some other recurring period of time.

In some cases, the location server 120 might obtain several observations regarding a particular wireless access point, some of which indicate that the wireless access point was observed at different locations. To reconcile these differences, the location server 120 can calculate a single location that represents each of these individual observations. In some cases, the location server 120 can calculate a geographical centroid representing each of the observations.

Figure 2A:
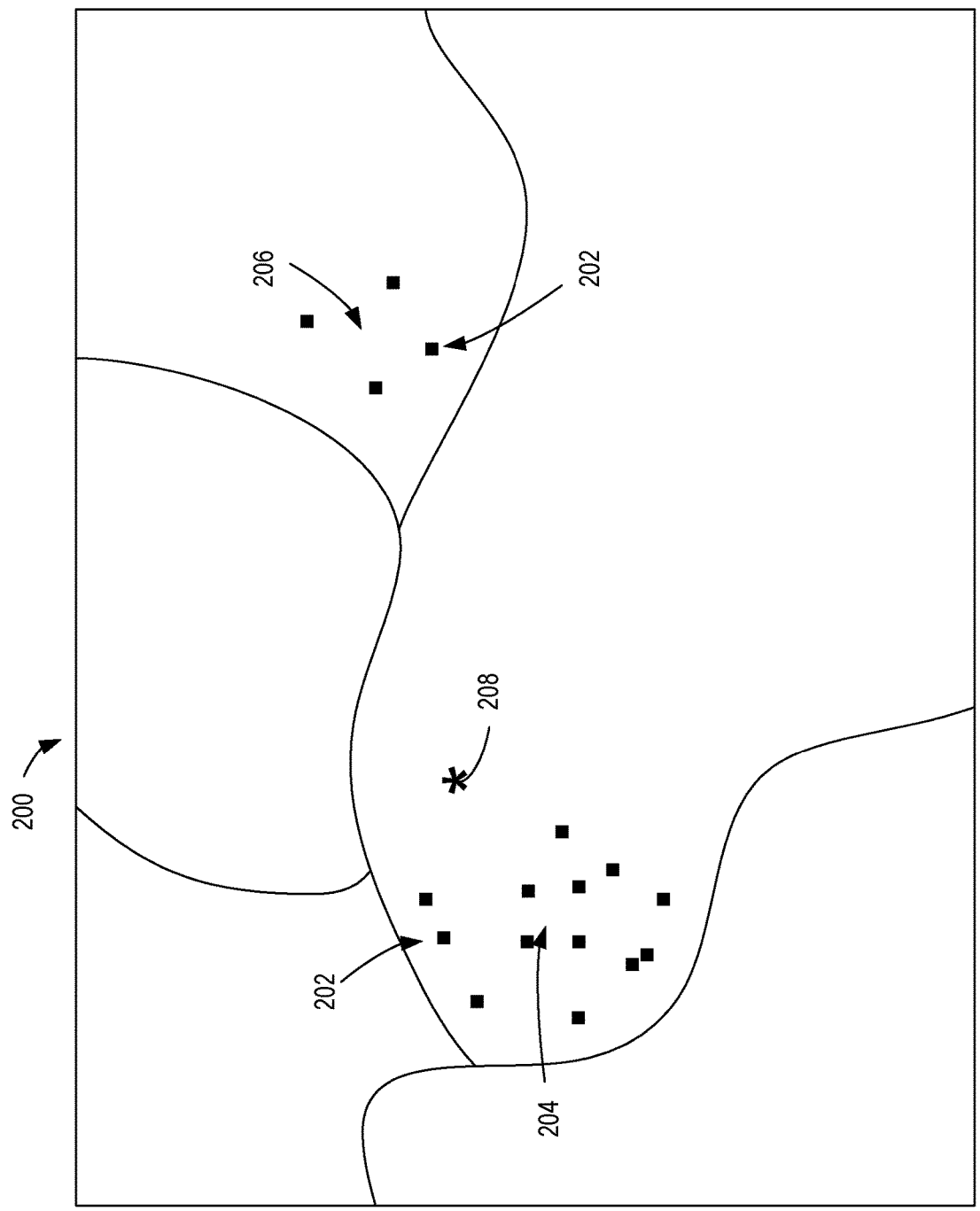
FIG. 2A is a diagram showing an example process for determining a location of a mobile device.

However, in some cases, calculating a geographical centroid may lead to inaccurate results. For example, FIG. 2A shows a map 200 of a geographical region indicating locations at which a particular wireless access point have been observed by mobile devices. Each of these observations is represented by a corresponding point 202. In this example, the wireless access point was originally positioned at a location 204. However, at some point in time, the wireless access point was relocated to a new location 206. Accordingly, the points 202 are grouped around both the location 204 (e.g., corresponding to earlier observations of the wireless access point) and the location 206 (e.g., corresponding to later observations of the wireless access point). The geographical centroid 208 of these observations reflects neither the location 204 nor the location 206. Thus, using this technique, the location server 120 may provide an inaccurate location estimate.

As another example, FIG. 2B shows another map 250 of a geographical region indicating locations at which a particular wireless access point have been observed by mobile devices. Each of these observations is represented by a corresponding point 252. In this example, the wireless access point is mounted to a moving vehicle, and continuously moves over a period of time. Accordingly, the points 252 are scattered along the wireless access point's travel path. Because of this scattering, the geographical centroid 254 of these observations does not reflect the location of the wireless access point at any particular point of time, nor does it reflect the final location of the wireless access point. Thus, using this technique, the location server 120 may provide an inaccurate location estimate.

To enhance the accuracy of location estimates, the location server 120 can determine a locational stability for each wireless access point. As an example, the locational stability of a wireless access point can refer to the permanence of the wireless access point at a particular location. If a mobile device observes a wireless access point, and the location server 120 determines that the wireless access point is stable (e.g., a determination is made that the wireless access point has not moved for a period of time), the location server 120 can provide the mobile device with an estimated location corresponding to the stable wireless access point. However, if a mobile device observes a wireless access point, and the location server 120 determines that the wireless access point is unstable (e.g., a determination is made that the wireless access point has recently moved to a new location), the location server 120 can withhold the location of the unstable access point from the mobile device. Thus, the mobile device is less likely to receive an inaccurate estimated location.

Figure 3A:
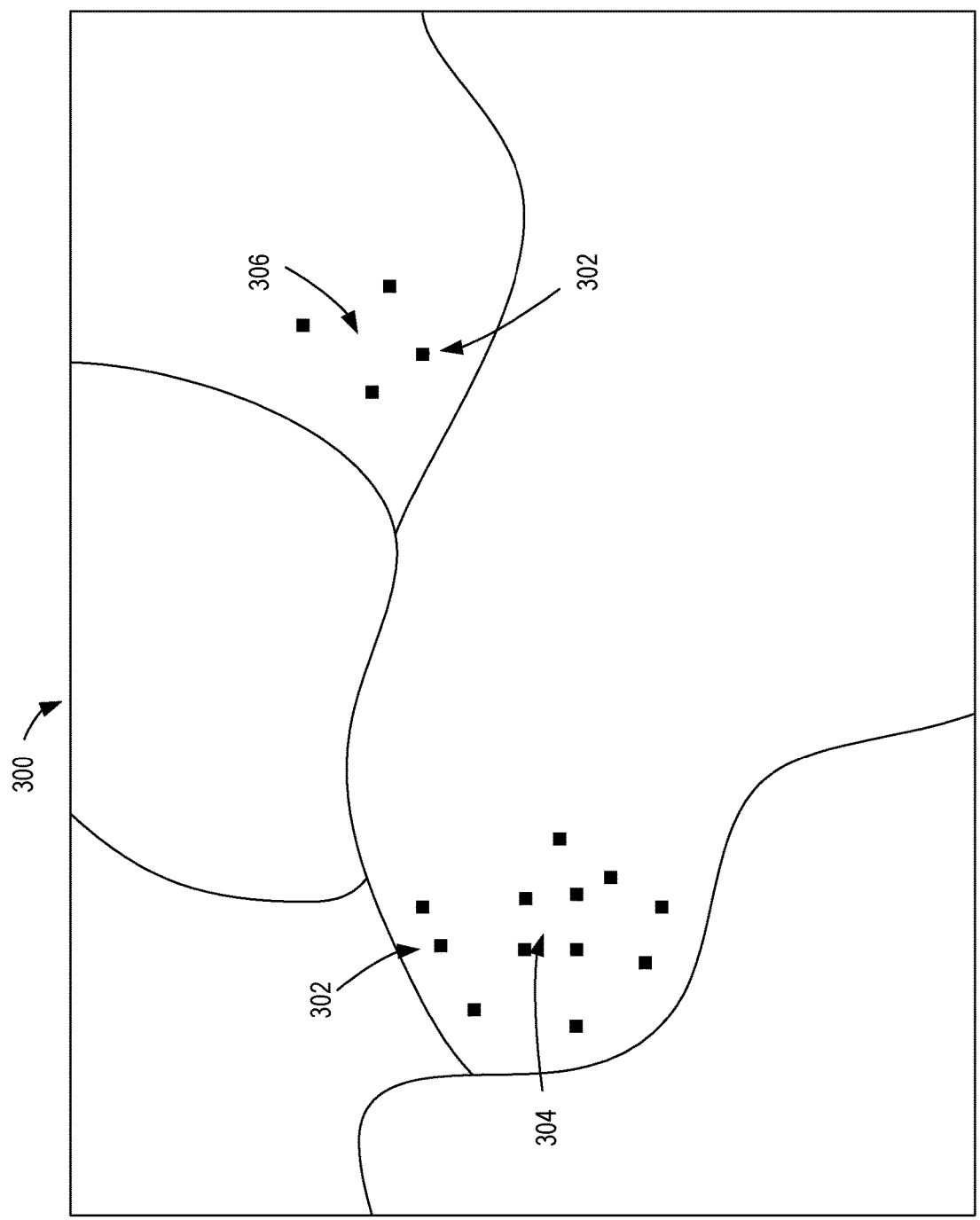
FIG. 3A-3C are diagrams showing another example process for determining a location of a mobile device.
Figure 3B:
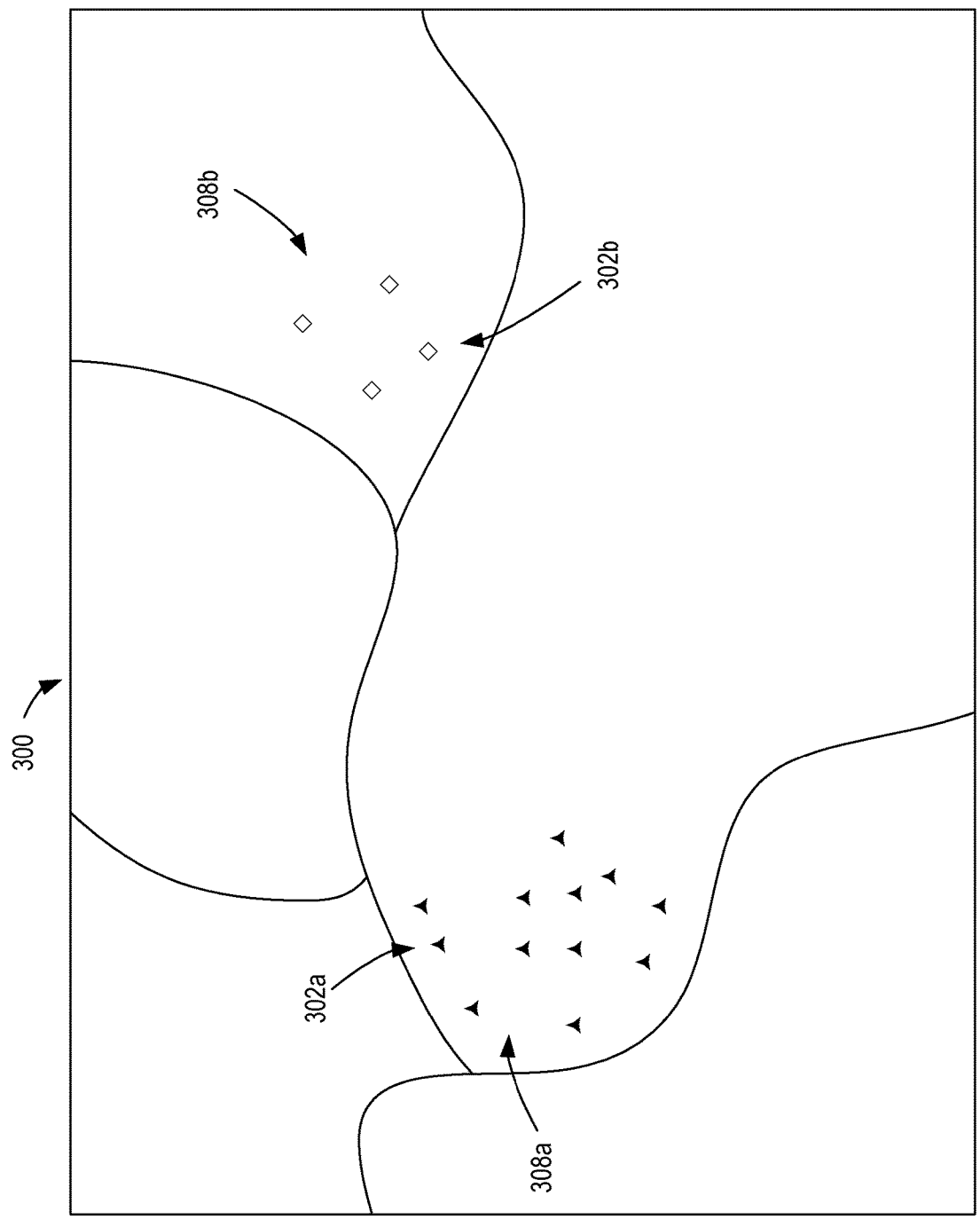
Figure 3C:
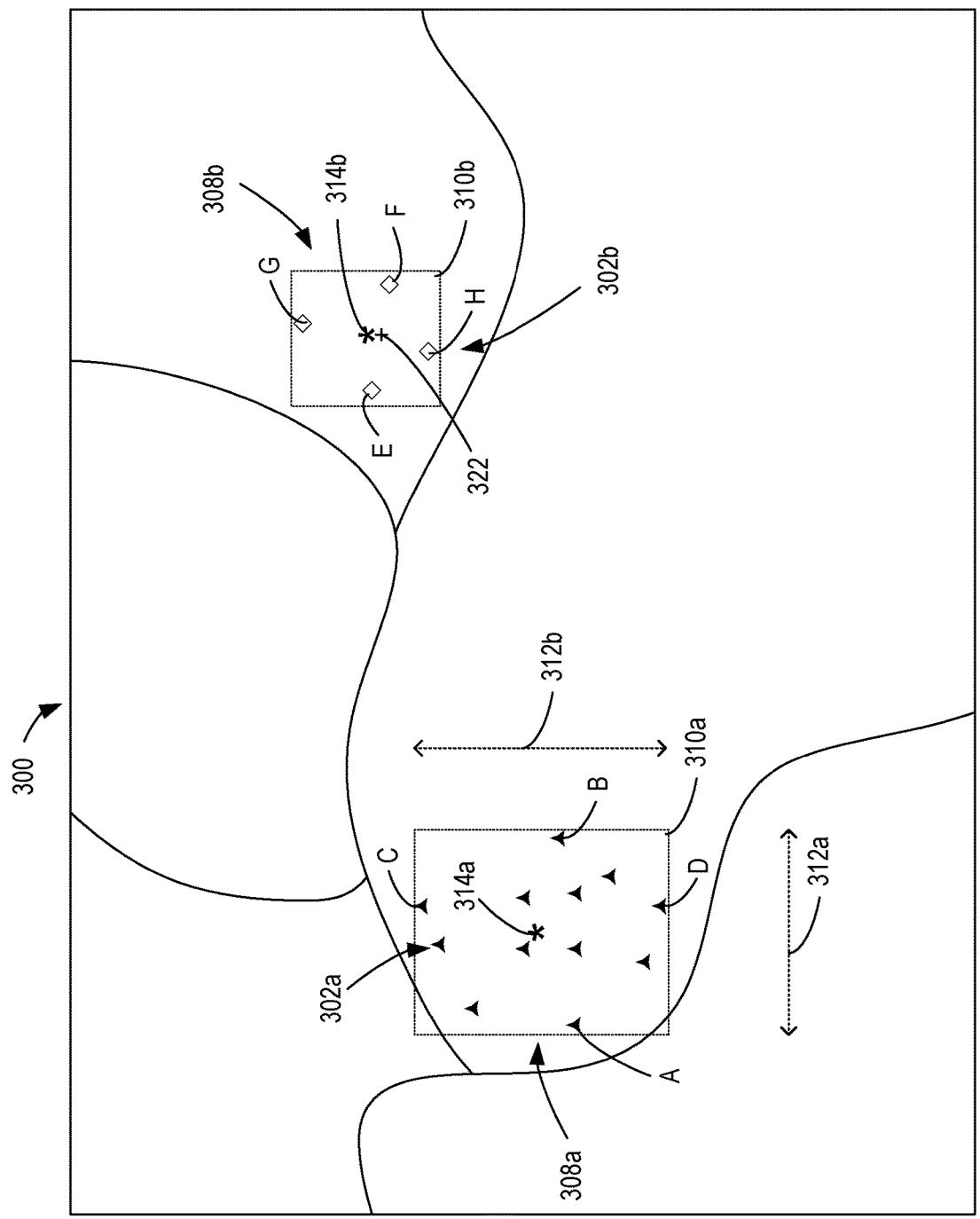

An example process for determining a locational stability of a wireless access point is shown in FIGS. 3A-3C. The process shown in in FIG. 3A-3C can be performed, for example, by the location server 120 enhance the accuracy of location estimates.

FIG. 3A shows a map 300 of a geographical region indicating locations at which a particular wireless access point have been observed by mobile devices. Each of these observations is represented by a corresponding point 302. In this example, the wireless access point was originally positioned at a location 304. However, at some point in time, the wireless access point was relocated to a new location 306. Accordingly, the points 302 are grouped around both the location 304 (e.g., corresponding to earlier observations of the wireless access point) and the location 306 (e.g., corresponding to later observations of the wireless access point).

The points 302 are grouped or classified into one or more clusters based on their locations. For instance, as shown in FIG. 3B, first points 302a are grouped into a first common cluster 308a (denoted by solid triangle symbols), while second points 302b are grouped into a second common cluster 308b (denoted by outlined diamond symbols). Thus, the two clusters represent observations of the wireless access point when the wireless access point is positioned at each of two distinct locations.

Various techniques can be used to group the points into clusters. In some cases, the points can be grouped using the density-based spatial clustering of applications with noise (DBSCAN) technique. DBSCAN is a density-based clustering that, when given a set of points in some space, groups together points that are closely packed together (e.g., points with many nearby neighbors), marking as outliers points that lie alone in low-density regions (e.g., whose nearest neighbors are too far away).

DBSCAN utilizes two parameters: ε (eps) and the minimum number of points required to form a dense region (minPts). The technique starts with an arbitrary starting point that has not been visited (e.g., one of points 302). This point's ε-neighborhood (e.g., the area within a radius ε of the point) is retrieved, and if it contains sufficiently many points, a cluster is started. Otherwise, the point is labeled as noise. Note that this point might later be found in a sufficiently sized ε-environment of a different point and hence be made part of a cluster.

If a point is found to be a dense part of a cluster, its ε-neighborhood is also part of that cluster. Hence, all points that are found within the ε-neighborhood are added, as is their own ε-neighborhood when they are also dense. This process continues until the density-connected cluster is completely found. Then, a new unvisited point is retrieved and processed, leading to the discovery of a further cluster or noise.

Although the use of DBSCAN is described herein, this is merely one example. In practice, other techniques can be used to group points into cluster, either in addition to or in conjunction with DBSCAN. For example, in some cases, points can be grouped into clusters using K-means clustering, hierarchical cluster analysis (HAC), or other clustering techniques.

After the points are grouped into clusters, the center of each cluster is determined. For example, as shown in FIG. 3C, each of the points 302a in the first cluster 308a can be bounded by a first box 310a. The first box 310a can extend, for example, along a first direction 312a (e.g., an x-direction or a latitudinal direction) from the leftmost point A to the rightmost point B. Further, the first box 310a can extend along a second direction 312b (e.g., a y-direction or a longitudinal direction) from the uppermost point C to the bottommost point D. The center 314a of the first box 310a (represented as an asterisk) can be the geometric center of the first box 310a.

Further, each of the points 302b in the second cluster 308b can be bounded by a second box 310b. The second box 310b can extend, for example, along the first direction 312a from the leftmost point E to the rightmost point F. Further, the second box 310b can extend along the second direction 312b from the uppermost point G to the bottommost point H). The center 314b of the second box 310b (represented as an asterisk) can be the geometric center of the second box 310b.

If the first cluster 308a and the second cluster 308b are sufficiently close to each other and the observations in each of the clusters overlaps in time, the first cluster 308a and the second cluster 308b can be merged together. In some cases, the distance between two clusters can be determined by measuring the distance between the centers of the boxes for each of the clusters. If the distance is sufficiently small (e.g., less than a particular threshold distance) and the observations overlap in time, the clusters can be merged together. For example, to determine whether the first cluster 308a and the second cluster 308b can be merged, the distance between the center 314a and the center 314b can be measured. If the distance is sufficiently small (e.g., less than a particular threshold distance) and the observations in the first cluster 308a overlap in time with the observations in the second cluster 308b, the first cluster 308a and the second cluster 308b can be merged together. The merging of clusters is described in greater detail with respect to FIGS. 8A-8C.

If the wireless access point is stable with respect to a particular cluster, a location representing that cluster can be provided as the location of the wireless access point. In turn, this location can be used as an estimated location of a mobile device that had observed the wireless access point. In some cases, a cluster can be represented by an average of all of the locations in the cluster (e.g., a centroid of all of the locations in the cluster). For example, if the wireless access point is stable with respect to cluster 308b, a centroid 322 (represented by a cross symbol) can be determined by averaging the position of each of the points 302b. In turn, the centroid 322 can used as an estimated location of a mobile device that had observed the wireless access point.

The stability of a wireless access point can be determined in various ways. For example, in some cases, a determination that can made whether the N most recent recorded observations are associated with a common cluster, and whether a time span between the N most recent recorded observations exceeds a threshold period of time. If the N most recent recorded observations are associated with a common cluster, this may indicate that the wireless access point has been observed at a particular location over a sufficiently high number of individual observations. For example, this can indicate a relatively high degree of observational precision. Further, if the time span between the N most recent recorded observations exceeds a threshold period of time, this may indicate that wireless access point can be observed at the particular location over a sufficiently long period of time. For example, this can indicate a relatively high degree of stability over time.

If both of these conditions are met, then the wireless access point is determined to be stable. Correspondingly, if a mobile device subsequently observes the wireless access point, the location of the wireless access point can be transmitted to the mobile device as an estimated location of the mobile device. In some cases, the centroid of the points in the cluster can be used as the location of the wireless access point.

However, if both of these conditions are not met, then the wireless access point is determined to be unstable. Correspondingly, if a mobile device subsequently observes the wireless access point, the location of the wireless access point can be withheld from the mobile device, such that it is not used as an estimated location of the mobile device. Thus, the mobile device is less likely to receive an inaccurate estimated location.

In this example, the points E, F, G, and H correspond, in sequence, to the four most recent observations of the wireless access point. Further, a time span between the earliest of these observations (e.g., point E) and the most recent of these observations (e.g., point H) is $t_{observed}$. If the number of recorded observations are associated with the common cluster 308b (i.e., four) exceeds a threshold number of points $N_{threshold}$, and the time span $t_{observed}$ exceeds a threshold period of time $t_{threshold}$, then the wireless access point is determined to be stable. Accordingly, if a mobile device subsequently observes the wireless access point, the centroid 322 of the points 302b of the second cluster 308b is transmitted to the mobile device as an estimated location of the mobile device. Otherwise, the location of the second cluster 308b is withheld from the mobile device.

The thresholds $N_{threshold}$ and $t_{threshold}$ can vary, depending on the implementation. As an example, $N_{threshold}$ can be 1, 10, 100, or some other threshold amount. As another example, $t_{threshold}$ can be 1 second, 1 minute, 1 hour, 1 day, or some other threshold amount of time.

$N_{threshold}$ and $t_{threshold}$ need not be fixed values. In some cases, for each wireless access point, $N_{threshold}$ and/or $t_{threshold}$ for that wireless access point can depend on the number of different locations at which the wireless access point as been observed. As an example, for a wireless access point that moves more often (e.g., observations of that wireless access point are divided amongst a higher number of clusters), $N_{threshold}$ and/or $t_{threshold}$ can be higher. Thus, the requirements for determining that the wireless access point is stable are stricter based on the past behavior of the wireless access point. As another example, for a wireless access point that moves less often (e.g., observations of that wireless access point are divided amongst a smaller number of clusters), $N_{threshold}$ and/or $t_{threshold}$ can be lower. Thus, the requirements for determining that the wireless access point is stable are looser based on the past behavior of the wireless access point.

In some cases, for each wireless access point, $N_{threshold}$ and/or $t_{threshold}$ for that wireless access point can depend on how often the wireless access point has been observed. As an example, for a wireless access has been observed less frequently (e.g., once a week), $N_{threshold}$ and/or $t_{threshold}$ can be higher. Thus, the requirements for determining that the wireless access point is stable are stricter based on prior observations of the wireless access point. As another example, for a wireless access point that has been observed more frequently (e.g., once an hour), $N_{threshold}$ and/or $t_{threshold}$ can be lower. Thus, the requirements for determining that the wireless access point is stable are looser based on prior observations of the wireless access point.

Although FIG. 3A-3C show a process for determining a locational stability of a wireless access point using example observations, it is understood that this is merely an illustrative example. In practice, the technique can be performed using a larger number of observations and/or can be used to group points into a larger number of different clusters.

FIGS. 4A and 4B show an example result of the process described herein. FIG. 4A is a scatter plot showing a number of different observations of a wireless access point (denoted by points 402), and the locations associated with each of those observations. Longitudinal positions are indicated with respect to the x-axis, and latitudinal positions are indicated with respect to the y-axis. FIG. 4B is a scatter plot showing the same observations of the wireless access point (denoted by points 404), and their grouping into different clusters. Times of observation are indicated with respect to the x-axis, and the cluster identification numbers are indicated with respect to the y-axis. In this example, the observations correspond to a stationary wireless access device.

As shown in FIG. 4A, the observations are concentrated around a particular location. For instance, the locations do not vary significantly from one another. Further, as shown in FIG. 4B, the observations are grouped into a single cluster, regardless of the time at which the observation occurred. Thus, the wireless access point is stable, and the location of the wireless access point can be provided in response to a location request by a mobile device.

Figures 5A, 5B:
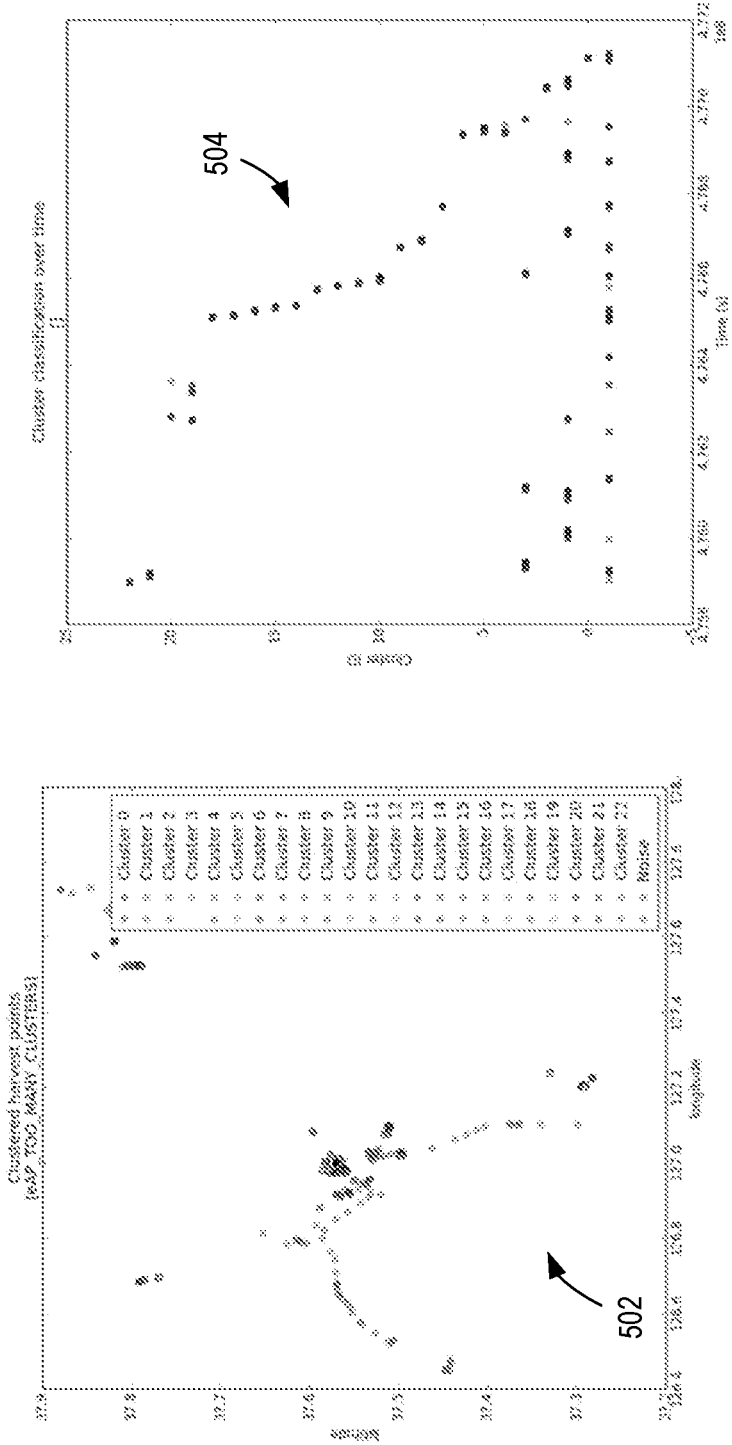

FIGS. 5A and 5B show another example result of a process described herein. FIG. 5A is a scatter plot showing a number of different observations of a wireless access point (denoted by points 502), and the locations associated with each of those observations. Longitudinal positions are indicated with respect to the x-axis, and latitudinal positions are indicated with respect to the y-axis. FIG. 5B is a scatter plot showing the same observations of the wireless access point (denoted by points 504), and their grouping into different clusters. Times of observation are indicated with respect to the x-axis, and the cluster identification numbers are indicated with respect to the y-axis. In this example, the observations correspond to a wireless access point that frequently moves (e.g., a wireless access point that is mounted to a moving vehicle).

As shown in FIG. 5A, the observations are dispersed. For example, some of the locations are dispersed relative to other locations. Further, as shown in FIG. 5B, the observations are grouped into one of multiple different clusters, depending on the time of observation. If the wireless access point is sufficiently stable, the location of the wireless access point can be provided in response to a location request by a mobile device. For example, if the N most recent recorded observations are associated with a common cluster, and if the time span between the N most recent recorded observations exceeds a threshold period of time, the location of the wireless access point can be provided to the mobile device. Otherwise, the location can be withheld from the mobile device.

In some cases, if a wireless access point has "moved" between a sufficiently high number of discrete locations, the location of the wireless access point can be withheld from mobile devices moving forward, even if the wireless access point is subsequently stable with respect to a cluster (e.g., even if the wireless access point remains in a particular location for a particular amount of time and/or over a particular number of observations). For example, the location of a wireless access point can be withheld entirely if the wireless access point has been observed at $N_{cluster,maximum}$ different clusters or more over time. As another example, the location of a wireless access point can be withheld if the wireless access point has transitioned locations $N_{transition,maximum}$ times or more over time. In some cases, a "transition" can be counted as each time a wireless access point is observed at one cluster, and subsequently is observed at another cluster. In some cases, a "transition" can be counted as each time a wireless access point is observed at a unique cluster (e.g., a new cluster not corresponding to previous clusters of observations). In practice, $N_{cluster,maximum}$ and $N_{transition,maximum}$ can differ, depending on the implementation.

This can be useful, for example, in identifying mobile wireless access points that tend to frequently change in location, and reducing the likelihood that they are used for location estimates. For instance, this can reduce the likelihood that portable wireless access points or wireless access points mounted on vehicles are used for location estimates. For example, as shown in FIG. 5B, the points 504 have been grouped into several different clusters over time. If the wireless access point is determined to have moved between a sufficiently high number of discrete locations over time, the location of the wireless access point can be withheld entirely, such that it is not used for location estimation. In some cases, the location of the wireless access point can be withheld permanently (e.g., the location of the wireless access point is never provided to a mobile device in the future).

Figures 6A, 6B:
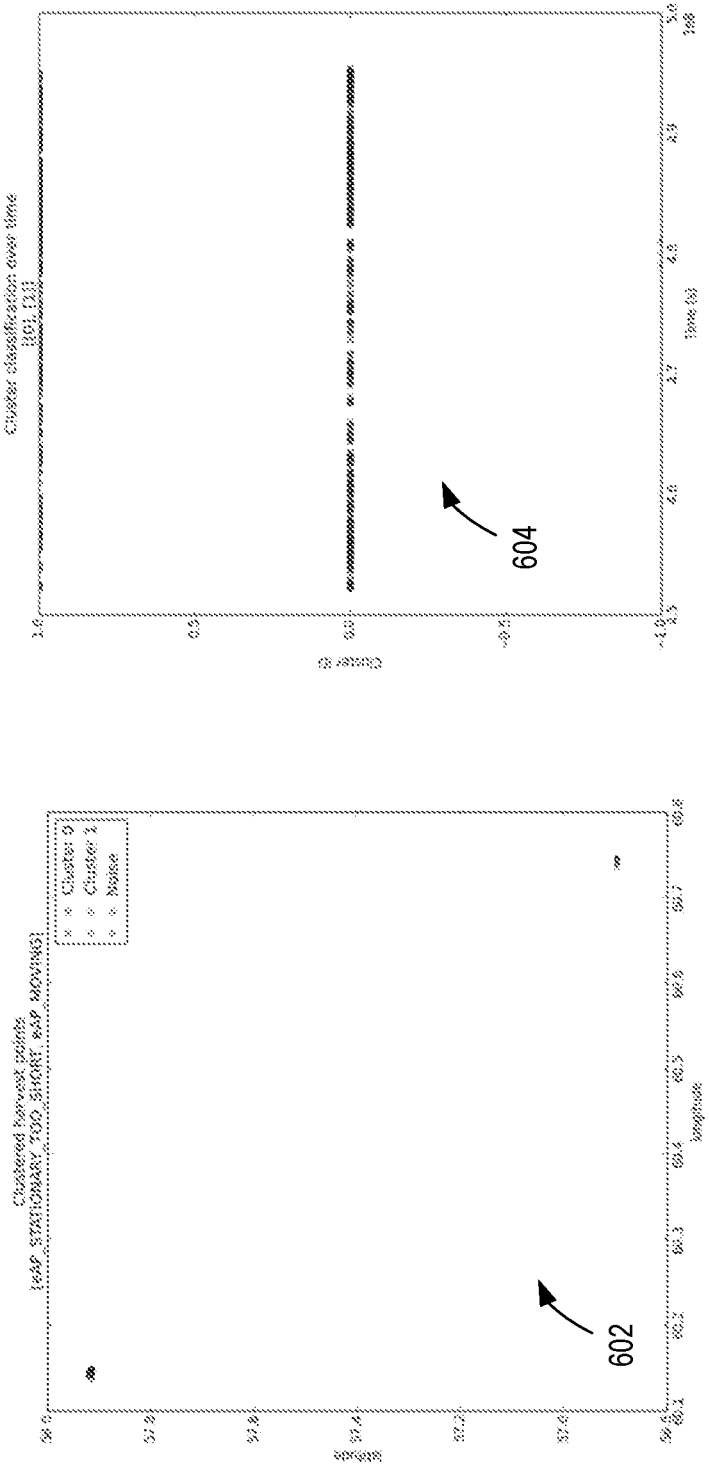

FIGS. 6A and 6B show another example result of a process described herein. FIG. 6A is a scatter plot showing a number of different observations of a wireless access point (denoted by points 602), and the locations associated with each of those observations. Longitudinal positions are indicated with respect to the x-axis, and latitudinal positions are indicated with respect to the y-axis. FIG. 6B is a scatter plot showing the same observations of the wireless access point (denoted by points 604), and their grouping into different clusters. Times of observation are indicated with respect to the x-axis, and the cluster identification numbers are indicated with respect to the y-axis. In this example, the observations correspond to a wireless access point that frequently moves between two locations (e.g., a wireless access point that is deployed at two different locations, and inactive when being moved between the locations), or two different wireless access points in distinct locations sharing the same identifier.

As shown in FIG. 6A, the observations are concentrated around two locations. Further, as shown in FIG. 6B, the observations are grouped into one of two different clusters, depending on the time of observation. In a similar manner as described above, if the wireless access point is sufficiently stable, the location of the wireless access point can be provided in response to a location request by a mobile device. For example, if the N most recent recorded observations are associated with a common cluster, and if the time span between the N most recent recorded observations exceeds a threshold period of time, the location of the wireless access point can be provided to the mobile device. Otherwise, the location can be withheld from the mobile device. In this example, the wireless access point is unstable, as the wireless access point's observations frequently transition between the two clusters over time. Thus, the location of the wireless access point can be withheld.

Figures 7A, 7B:
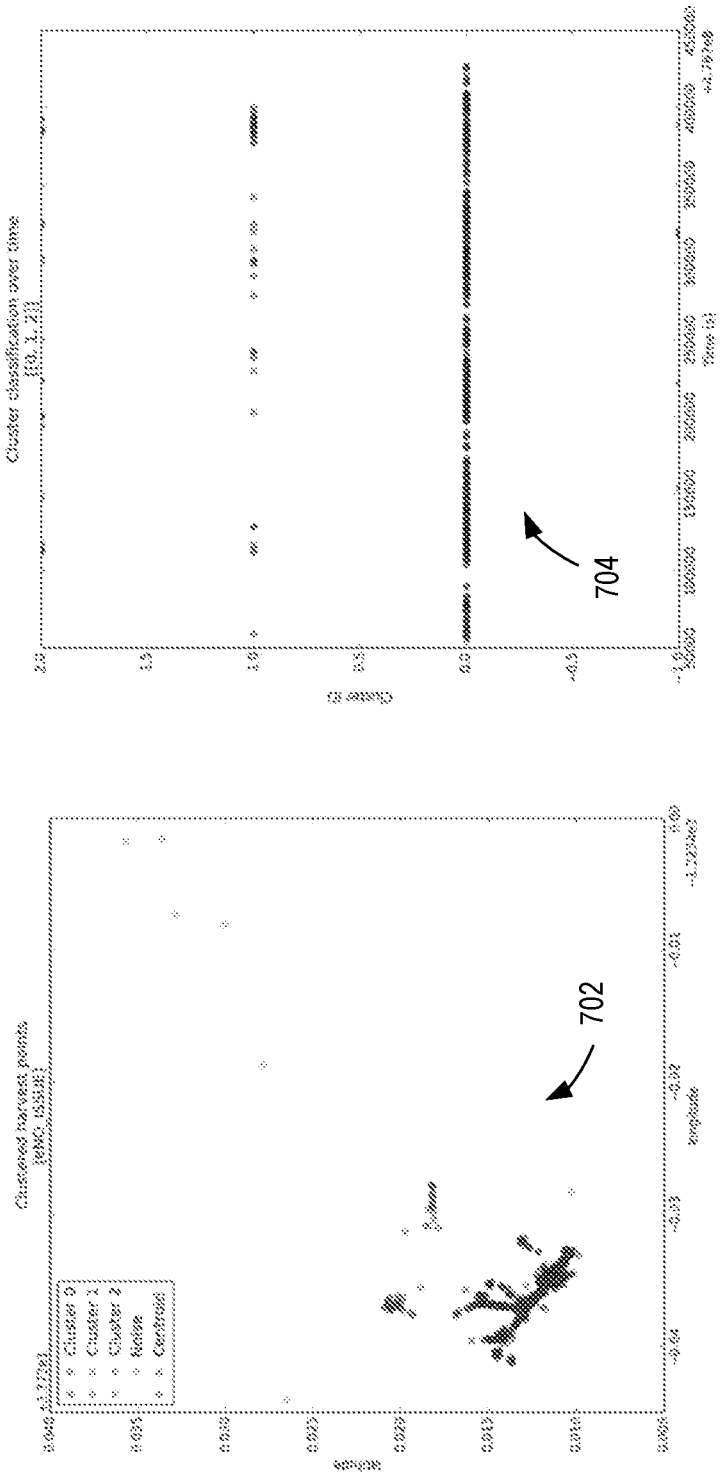

FIGS. 7A and 7B show another example result of a process described herein. FIG. 7A is a scatter plot showing a number of different observations of a wireless access point (denoted by points 702), and the locations associated with each of those observations. Longitudinal positions are indicated with respect to the x-axis, and latitudinal positions are indicated with respect to the y-axis. FIG. 7B is a scatter plot showing the same observations of the wireless access point (denoted by points 704), and their grouping into different clusters. Times of observation are indicated with respect to the x-axis, and the cluster identification numbers are indicated with respect to the y-axis. In this example, the observations correspond to a wireless access point that is frequently observed from three distinct areas around the wireless access point.

As shown in FIG. 7A, the observations are concentrated in three areas. Further, as shown in FIG. 7B, the observations are initially grouped into one of three different clusters, depending on the time of observation. However, as the clusters are sufficiently close and observations of each of the clusters overlap in time, the clusters can be merged together into a single cluster. This can be useful, for example, in combining observations of the same wireless access point positioned at the same location. Thus, the accuracy of the location estimation process can be improved. Further, the availability of the location estimation process can be improved, for example, by eliminating or otherwise reducing the misclassification of wireless access points as moving. The merging of clusters is described in greater detail below.

In a similar manner as described above, if the wireless access point is sufficiently stable, the location of the wireless access point can be provided in response to a location request by a mobile device. For example, if the N most recent recorded observations are associated with a common cluster, and if the time span between the N most recent recorded observations exceeds a threshold period of time, the location of the wireless access point can be provided to the mobile device. Otherwise, the location can be withheld from the mobile device.

Figure 8A:
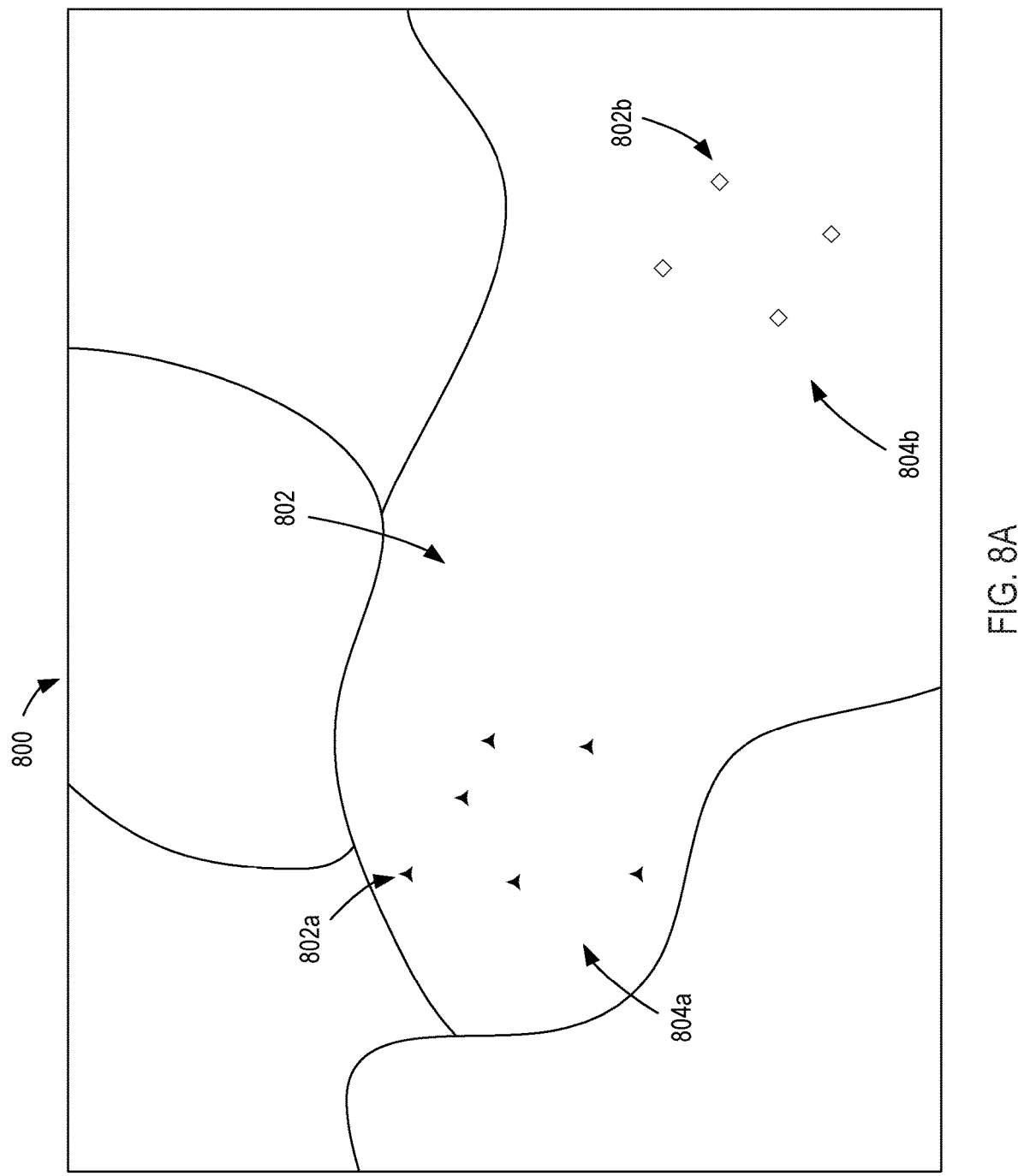
FIG. 8A-8C are diagrams showing an example process for merging clusters.
Figure 8B:
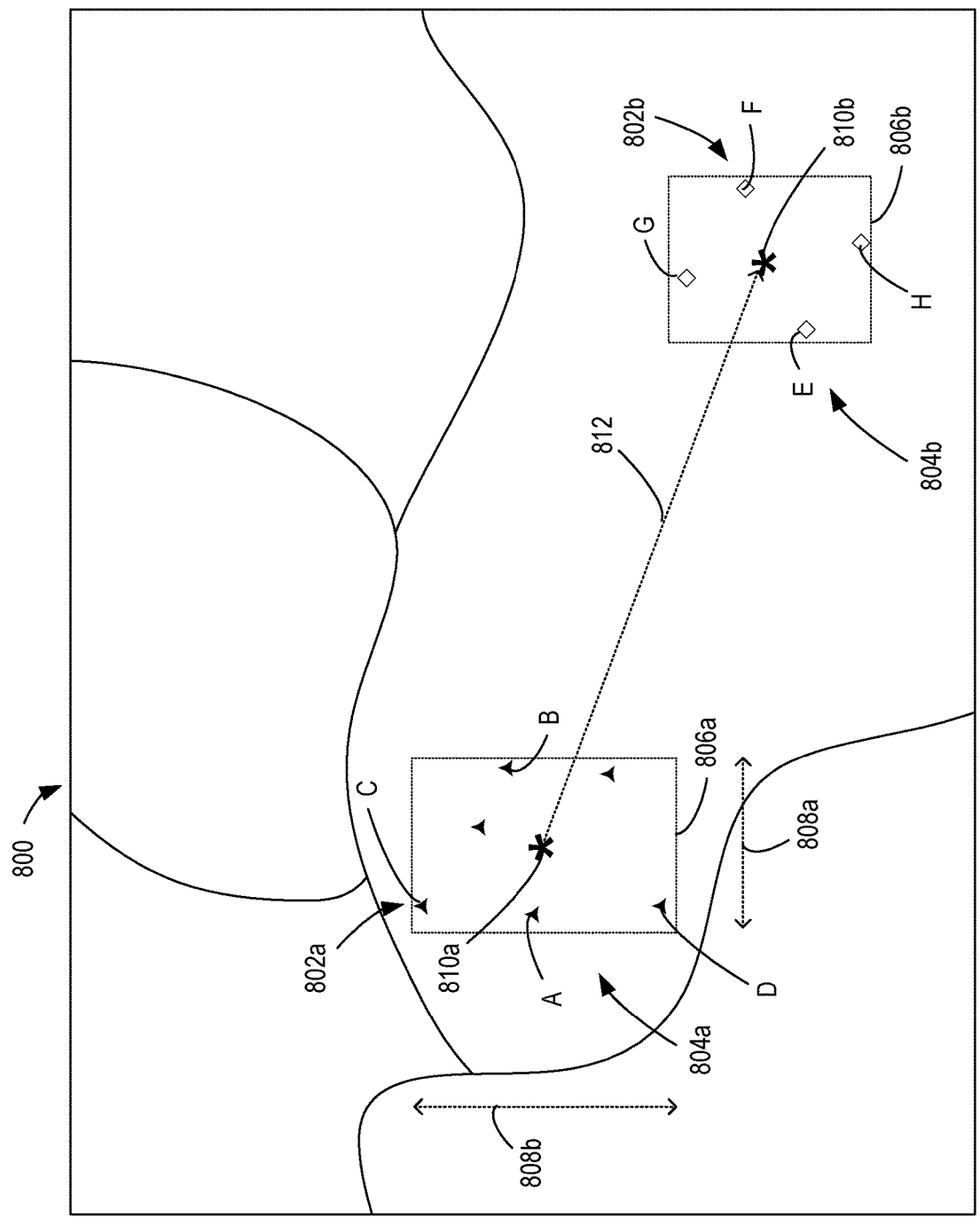
Figure 8C:
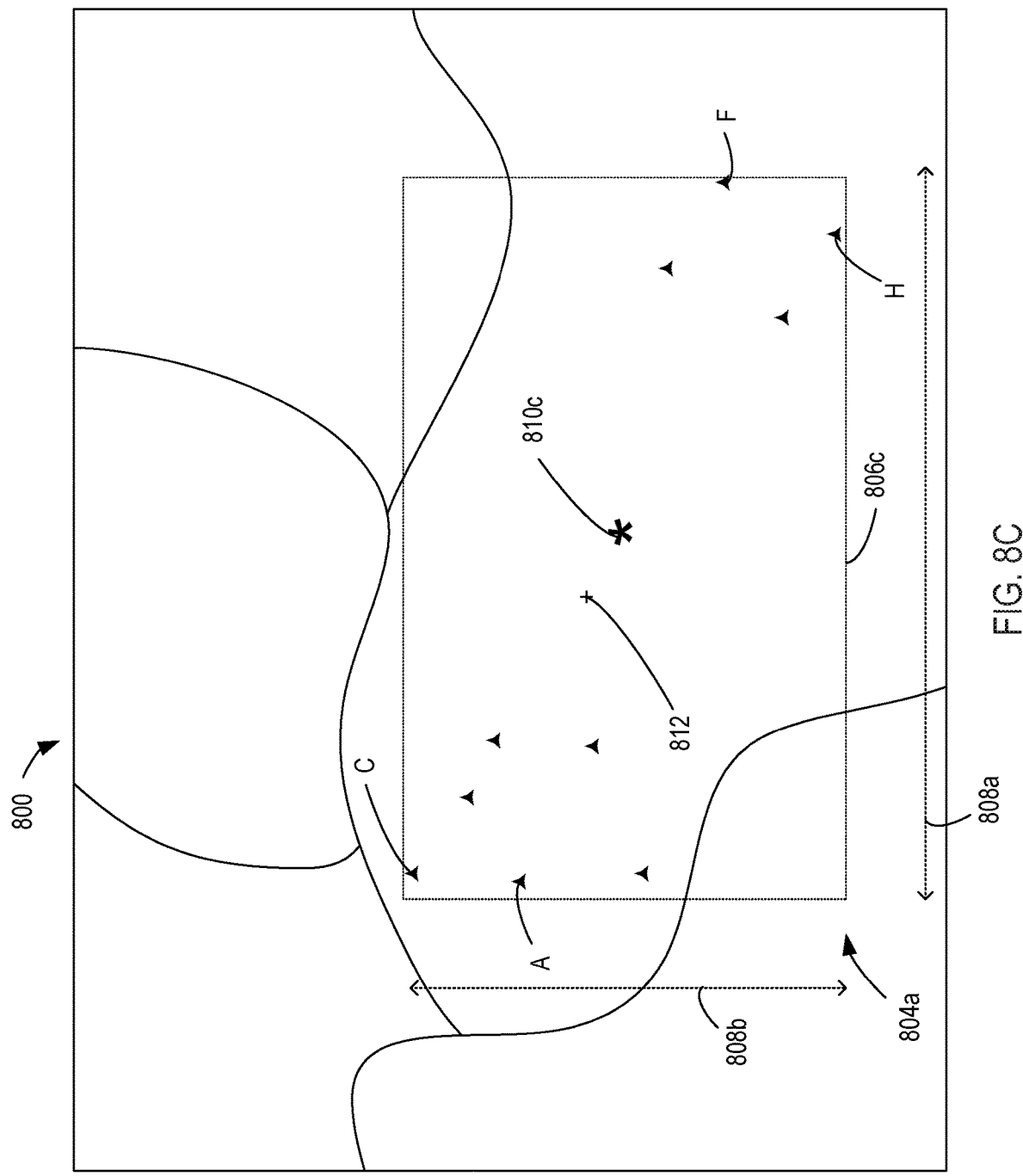

An example cluster merge process is shown in FIGS. 8A-8C. The process shown in in FIGS. 8A-8C can be performed, for example, by the location server 120 enhance the accuracy of location estimates.

FIG. 8A shows a map 800 of a geographical region indicating locations at which a particular wireless access point have been observed by mobile devices. Each of these observations is represented by a corresponding point 802.

In this example, each of the observations corresponds to the same wireless access point positioned at the same location. However, the observations are concentrated around two different locations. This could occur, for example, if users of the mobile devices are concentrated in two different areas within a relatively unpopulated area between (e.g., two areas having relatively high user traffic with an obstruction separating them), and a single wireless access point can be observed from both of these relatively highly populated areas. Thus, the observations from the mobile devices are concentrated within the different relatively highly populated areas, despite there being only a single fixed wireless access point. Due to the concentration of the observations with respect to two different relatively highly populated areas, a clustering technique (e.g., DBSCAN) might group the observations into two different clusters, despite the wireless access point having not moved. These observations can be merged together to improve the accuracy of location estimates. Further, this can improve the availability of location estimates by preventing the misclassification of wireless access points as moved.

For example, as shown in FIG. 8A, the points 802 are grouped into two different clusters based on their locations. For instance, first points 802a are grouped into a first common cluster 804a (denoted by solid triangle symbols), while second points 804b are grouped into a second common cluster 804b (denoted by outlined diamond symbols). As described herein, various techniques can be used to group the points into clusters (e.g., DBSCAN).

After the points are grouped into clusters, the center of each cluster is determined. For example, as shown in FIG. 8B, each of the points 802a in the first cluster 804a can be bounded by a first box 806a. The first box 806a can extend, for example, along a first direction 808a (e.g., an x-direction or a latitudinal direction) from the leftmost point A to the rightmost point B. Further, the first box 310a can extend along a second direction 808b (e.g., a y-direction or a longitudinal direction) from the uppermost point C to the bottommost point D. The center 810a of the first box 806a (represented as an asterisk) can be the geometric center of the first box 806a.

Further, each of the points 802b in the second cluster 804b can be bounded by a second box 806b. The second box 806b can extend, for example, along the first direction 808a from the leftmost point E to the rightmost point F. Further, the second box 806b can extend along the second direction 808b from the uppermost point G to the bottommost point H. The center 810b of the second box 806b (represented as an asterisk) can be the geometric center of the second box 806b.

The first cluster 804a and the second cluster 804b can be merged together based on the time spans associated with each cluster and the distance between the centers associated with each cluster. For example, each of the clusters can be associated with a particular time span (e.g., extending from the earliest observation in the cluster to the most recent observation in the cluster). If the time span of the first cluster 804a overlaps with the time span of the second cluster 804b, this may indicate that the observations from each of the clusters correspond to a wireless access point positioned at the same location. For example, this may indicate that that the same wireless access point is being observed from two different areas at once. Such an indication may favor merging the two clusters 804a and 804b.

As another example, a distance d can be determined between the center 810a and the center 810b. The distance d can be, for example, a direct or straight-line distance between the two points. If the distance d is small, this may indicate that the observations from each of the clusters correspond to a wireless access point positioned at the same location. For example, this may indicate that that the same wireless access point is being observed from two proximal areas at once (e.g., two publically accessible plazas or streets positioned on opposing sides of a parking garage). Such an indication may also favor merging the two clusters 804a and 804b.

In some cases, if the time span associated with the recorded observations of the first cluster 804a overlaps with a time span associated with the recorded observations of the second cluster 804b, and if a distance between the center 810a of the first cluster 804a and the center 810b of the second cluster 804b is less than a threshold distance $d_{threshold}$, then one cluster can be merged into another. Considering both the time span and the distance between clusters can be beneficial, for example, in differentiating observations of a single unmoving wireless access point (which should be merged together) from observations of two different wireless access points having the same identifier, such as the same MAC address (which should not be merged). For instance, observations that overlap in time and are geographically closer are more likely to correspond to the same unmoving wireless access point. Thus, these observations are more likely to be merged together. However, observations that overlap in time but are geographically distant are less likely to correspond to the same unmoving wireless access point (e.g., they may correspond to two different wireless access points having the same identifier), and are less likely to be merged together.

As an example, as shown in FIG. 8C, the second cluster 804b can be merged into the first cluster 804a upon determining that the merge criteria are satisfied. Further, a new box 806c can be determined for the first cluster 804a. For example, the new box 806c can extend, along the first direction 808a from the leftmost point A to the rightmost point F. Further, the new box 806c can extend along the second direction 808b from the uppermost point C to the bottommost point H. Further, a new center 810c of the new box 806c (represented as an asterisk) can be the geometric center of the new box 806c. The center 310c can be used to determine whether the merged cluster 804a can be merged with other clusters.

Further, as described above, a cluster can be represented by an average of all of the locations in the cluster (e.g., a centroid of all of the locations in the cluster). For example, if the wireless access point is stable with respect to merged cluster 804a, a centroid 812 (represented by a cross symbol) can be determined by averaging the position of each of the points 802a and 802b in the merged cluster 804a. In turn, the centroid 812 can used as an estimated location of a mobile device that had observed the wireless access point. This can be useful, for example, to better account for observations of a motionless wireless access point from two proximal areas at once with a gap in between (e.g., a motionless wireless access point position observed from two different areas with relatively high user traffic, separated by an area with relatively low user traffic). Thus, the accuracy of the location estimate can be improved. Further, the availability of the location estimate can be improved (e.g., instead of accounting the two clusters as separate locations and withholding the location of the wireless access point despite the location of the wireless access point not actually changing).

In some cases, the distance threshold $d_{threshold}$ can be determined based on a reach (e.g., a communications range) of a wireless access point. In some cases, this can be determined empirically. For example, if a particular type of wireless access point is measured as having a particular reach (e.g., a particular radial distance from the wireless access point), the value of the distance threshold $d_{threshold}$ can be assigned based on the measured reach (e.g., the same or similar value as the reach, or some multiple or fraction of the reach). In some cases, a common distance threshold $d_{threshold}$ can be used for each wireless access point of a particular type. As an example, each Wi-Fi access point broadcasting a signal according to the IEEE 802.11b standard can have a first distance threshold $d_{threshold1}$, each Wi-Fi access point broadcasting a signal according to the IEEE 802.11g can have a second distance threshold $d_{threshold2}$, a cellular network access points broadcasting a signal according to a particular cellular frequency band can have third distance threshold $d_{threshold2}$, and so forth. In some cases, a common distance threshold $d_{threshold}$ can be used for all wireless access points, regardless of type.

In some cases, the criteria for merging clusters together can depend on a density of wireless access points in the region. For example, if a region has a higher density of wireless access points, the criteria for merging clusters can be stricter. For instance, if there are a large number of different wireless access points per area, the distance threshold $d_{threshold}$ for merging clusters can be smaller. Thus, different clusters are more likely to be identified as corresponding to different discrete locations of a wireless access point, rather than corresponding to the same location. Further, if a region has a lower density of wireless access points, the criteria for merging clusters can be looser. For instance, if there are a small number of different wireless access points per area, the distance threshold $d_{threshold}$ for merging clusters can be higher. Thus, different clusters are more likely to be identified as corresponding to the same location of a wireless access point, rather than corresponding to different discrete locations.

In some cases, $N_{threshold}$ and/or $t_{threshold}$ can also depend on a density of wireless access points in the region. For example, if a region has a higher density of wireless access points, $N_{threshold}$ and/or $t_{threshold}$ can be higher, such that the criteria for a stable wireless access point are more strict. Thus, the location of a wireless access point is less likely to be used as a location estimate. Conversely, if a region has a lower density of wireless access points, $N_{threshold}$ and/or $t_{threshold}$ can be lower, such that the criteria for a stable wireless access point are more loose. Accordingly, the location of a wireless access point is more likely to be used as a location estimate.

This can be useful, for example, as a region having a higher density of wireless access points is more likely to have at least one stable wireless access point. Thus, the location server 120 can be more selective in determining a stability of a wireless access point, and is more likely to provide the location of wireless access points having a high degree of stability. Thus, the location estimate will be more accurate. However, in a region having a lower density of wireless access points, the number of candidate wireless access points is smaller. Thus, the location server 120 can be less selective in determining a stability of a wireless access point. Accordingly, an estimated location can be provided to a mobile device, despite the lower availability of candidate wireless access points.

Regions can be defined in various ways. For example, regions can be defined based on geographical coordinates. For instance, a region can be defined as a particular area defined by boundaries extending between three or more geographical points. As another example, regions can be defined based on surface area. For instance, a region can be defined as a particular area having a pre-determined surface area. As another example, regions can be defined based on municipal or official boundaries. For instance, a region can be defined based on city, county, state, and/or country boundaries. Also, other criteria can be used to defined boundaries. For instance, a region can be defined by a user-defined boundaries.

As described herein, various techniques can be used to group the points into clusters (e.g., DBSCAN). In some cases, a clustering technique can be performed with respect to all or substantially all points in a particular area. For example, for a given area, DBSCAN can be used to cluster each of the points in that area (e.g., each point can be used as an input in the DBSCAN technique).

In some cases, a clustering technique can be relatively computationally expensive to perform. Further, as the number of points increases, the amount of computational resources needed to perform the clustering technique also increases. Thus, it may be resource prohibitive to perform a clustering technique with respect to all of the available points in an area at once. For example, for a given area, using DBSCAN to cluster each of the points in that area may be resource prohibitive, as its performance scales relatively poorly with the inclusion of each additional point.

Further, in some cases, the majority of wireless access points are likely to be stable, and tend to have a large volume of observations over time. Thus, a computationally efficient clustering technique can be used to quickly ascertain that such wireless points only have a single cluster and do not need to be withheld.

To reduce the computational resources associated with performing a clustering technique, one or more points can be removed or "decimated" prior to clustering. Subsequently, the remaining points can be grouped into one or more clusters. After clustering, the removed points can be re-introduced and assigned to one or more of the clusters. This can be beneficial, for example, as performing a clustering technique (e.g., DBSCAN) on a smaller number of points can yield substantial savings in computational resources, and the resulting output can be the same or substantially the same as if the clustering technique had been performed with respect to all of the points at the same time.

An example clustering process is shown in FIGS. 9A-9D. The process shown in in FIGS. 9A-9D can be performed, for example, by the location server 120 to improve the computational efficiency of generating location estimates.

Figure 9A:
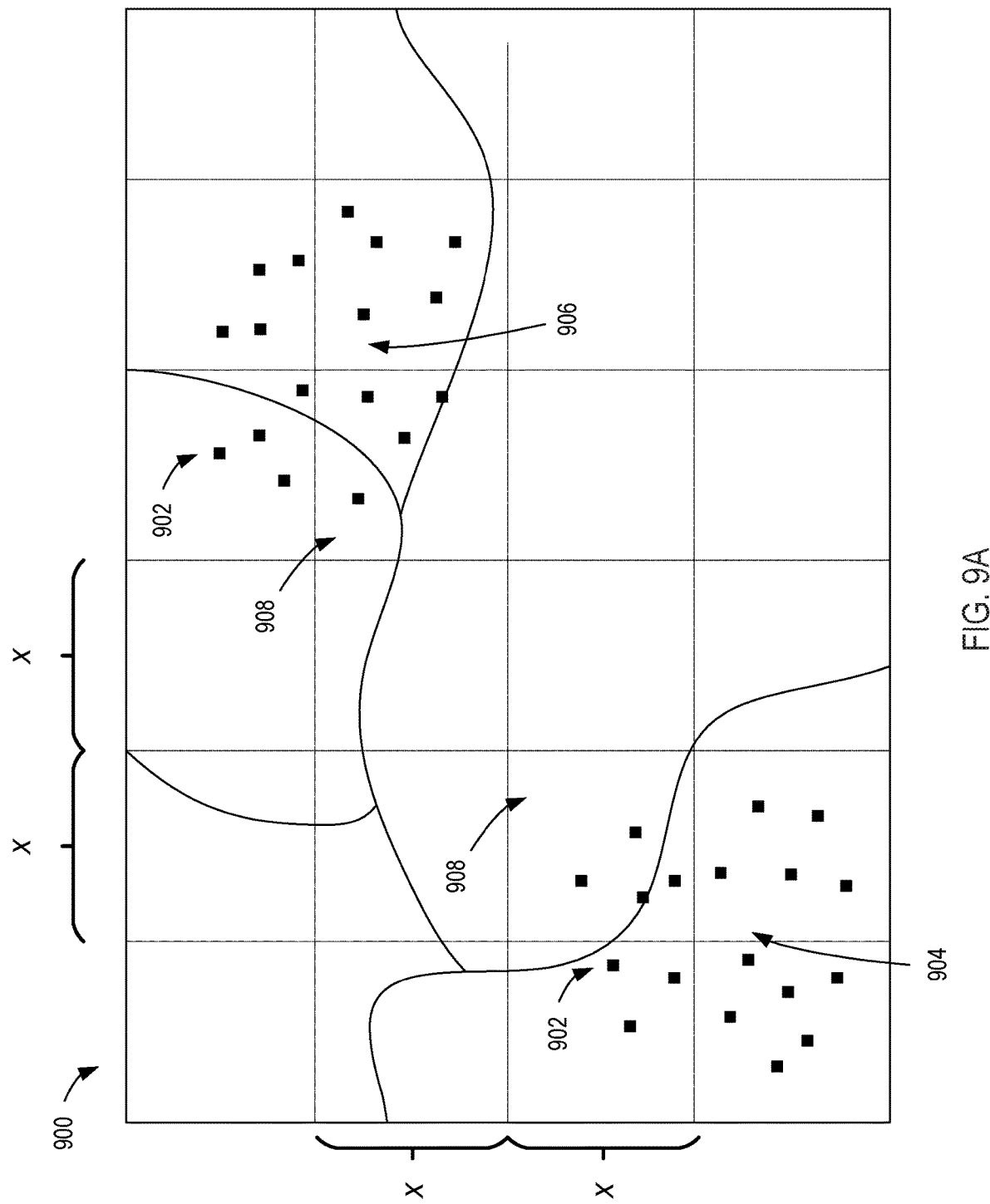

FIG. 9A shows a map 900 of a geographical region indicating locations at which a particular wireless access point have been observed by mobile devices. Each of these observations is represented by a corresponding point 902. In this example, the wireless access point was originally positioned at a location 904. However, at some point, the wireless access point was relocated to a new location 906. Accordingly, the points 902 are grouped around both the location 904 (e.g., corresponding to earlier observations of the wireless access point) and the location 906 (e.g., corresponding to later observations of the wireless access point).

As described herein, various techniques can be used to group the points into clusters. For example, the points can be grouped using the DBSCAN technique.

However, in some cases, prior to performing the DBSCAN technique, one or of the of points 902 can be removed or "decimated." For example, as shown in FIG. 9A, the map 900 can be divided into a grid, with each grid cell 908 having a dimension of x by x. In some cases, x can be equal to one fourth of the value of the ε (eps) parameter used in the DBSCAN technique (i.e., ε/4).

As shown in FIG. 9A, each of the points 902 are binned into the grid cells 908. Further, as shown in FIG. 9B, only a pre-determined number of points 902 in each grid cell 908 are used as inputs in the DBSCAN technique, while the remaining points 902 in the grid cell 908 are removed. In some cases, the pre-determined number of points 902 can be 1 plus the value of the minPts parameter used in the DBSCAN technique (i.e., minPts+1). For example, as shown in FIG. 9B, if minPts is 2, a maximum of three points are selected from each grid cell 908. Other values for minPts can be used, depending on the implementation.

In some cases, if the number of points in each grid cell 908 exceeds the pre-determined amount, points can be selected for input into the DBSCAN technique randomly or pseudo-randomly (e.g., selected using a random or pseudo random number generator). The unselected points can be removed. In some cases, points can be selected based on other considerations (e.g., based on their timestamp or location within the grid cell 908).

Figure 9C:
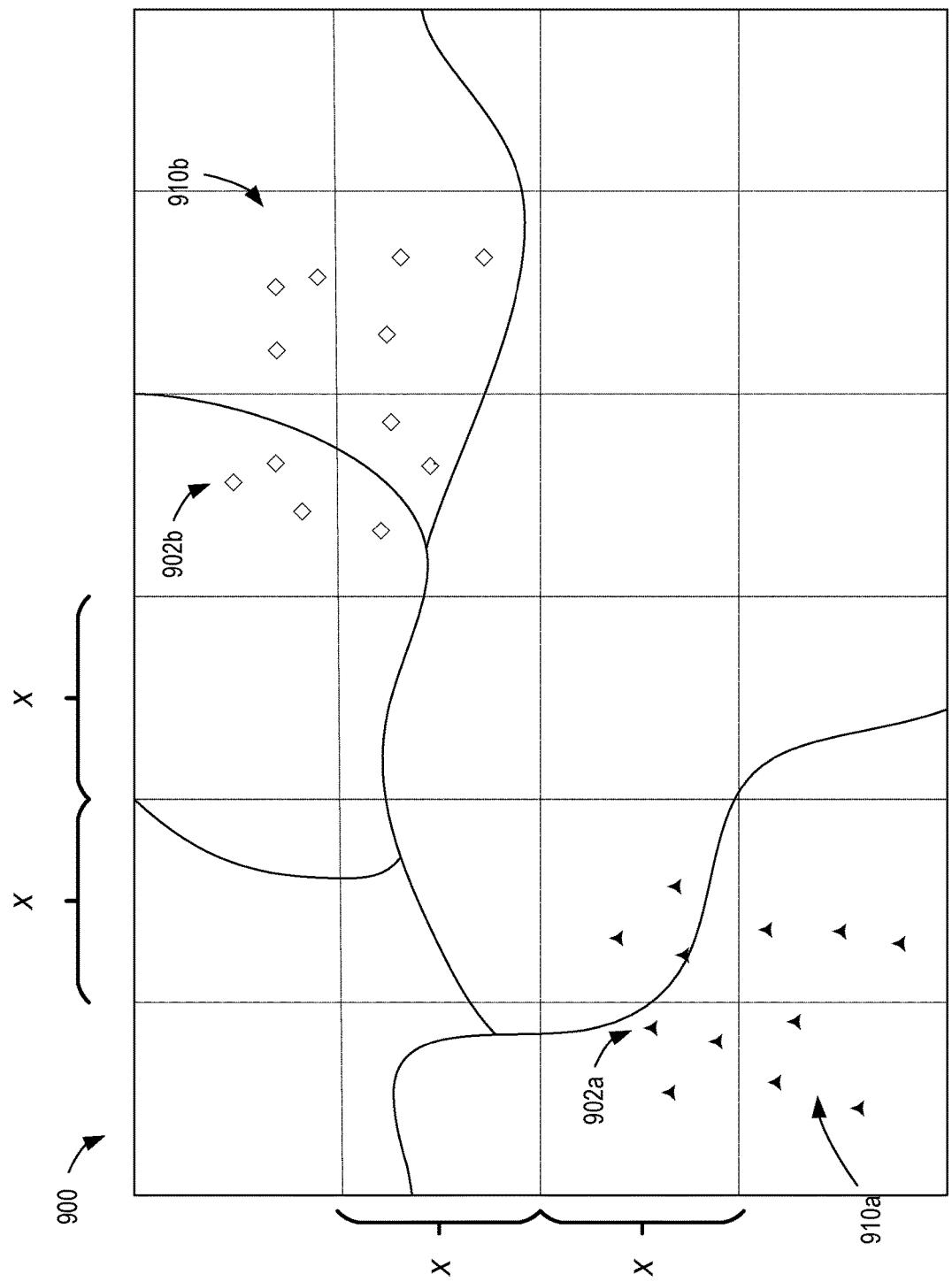

As shown in FIG. 9C, the remaining points 902 are grouped into one or more clusters based on their locations (e.g., using the DBSCAN technique, with parameters ε and minPts). For instance, first points 902a are grouped into a first common cluster 910a (denoted by solid triangle symbols), while second points 902b are grouped into a second common cluster 910b (denoted by outlined diamond symbols).

Figure 9D:
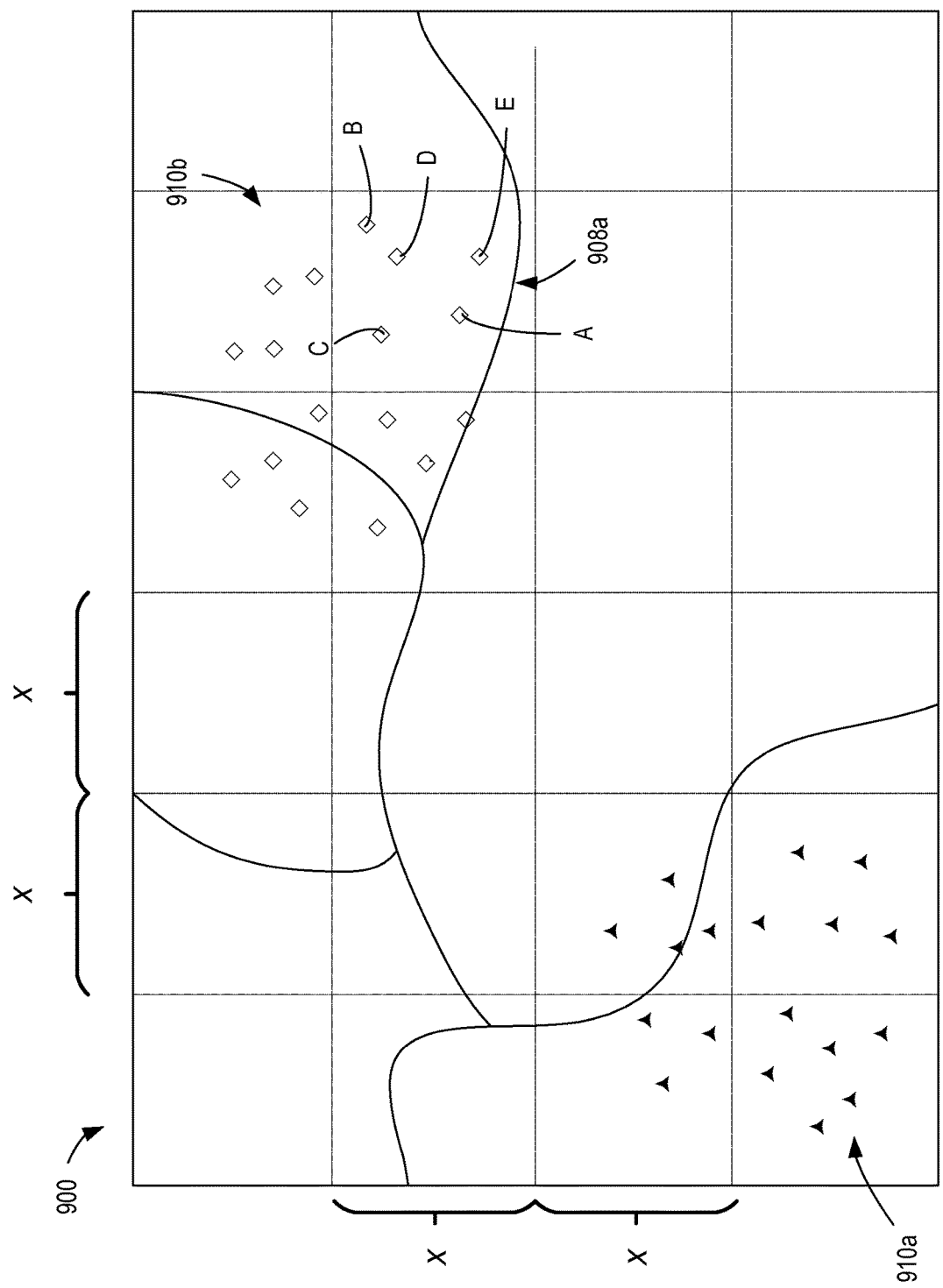

After clustering, each of the removed points are re-introduced and assigned to one of the clusters. Each re-introduced point is assigned to the same cluster as the other points in its bin. For example, as shown in FIG. 9D, removed points A and B were binned into the grid cell 908a. As grid cell 908a includes points C, D, and E assigned to the cluster 910b, the points A and B are assigned to the cluster 910b. Similarly, each of the other removed points can be re-introduced and assigned to one of the clusters based on the other points in its bin.

Accordingly, this enables the DBSCAN technique to be performed using a smaller number of input points, and can substantially improve the computational efficiency of the clustering process.

After clustering, the locational stability of the wireless access point can be determined, and the location of the wireless access point can be provided to a mobile device if the wireless access point is sufficient stable (e.g., as described with respect to FIG. 3C). In turn, this location can be used as an estimated location of the mobile device.

Although various drawings are included herein, it is understood that the drawings are not necessarily drawn to scale. The dimensions of certain elements and the spacing between elements have been altered for ease of illustration and/or to emphasize certain elements. For example, although FIGS. 3A-C, 8A-8C, and 9A-9D depict the clustering of various arrangements of points, the location and spacing of points are provided for illustrative purposes only.

Example Process

Figure 10:
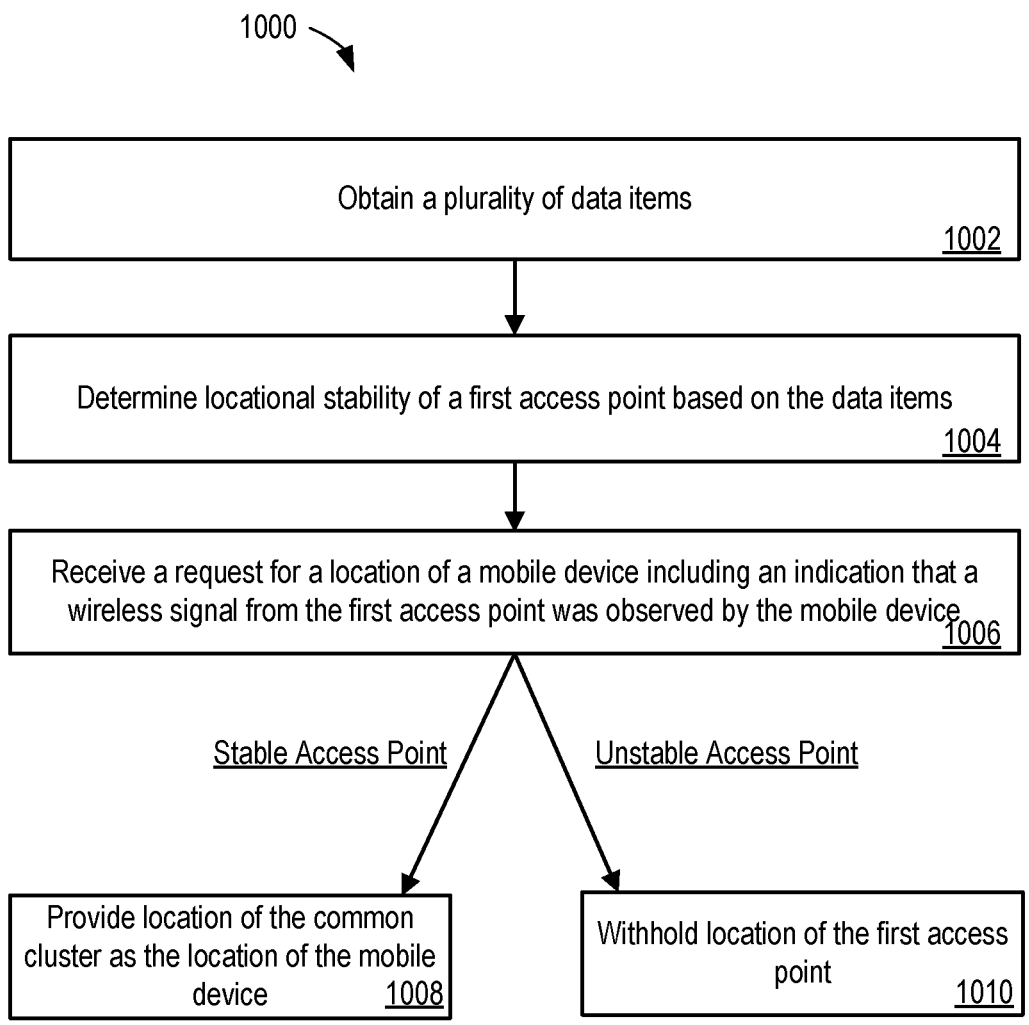
FIG. 10 is a flow chart diagram of an example process for determining a locational stability of a wireless access point.

An example process 1000 for determining a locational stability of a wireless access point is shown in FIG. 10. In some cases, the process 1000 can be used to determine the location of a mobile device, either without the use of a satellite-based location system or in conjunction with a satellite-based location system. The process 1000 can be performed for example, using the system 100 shown in FIG. 1 and/or the device architecture 1100 shown in FIG. 11.

In the process 1000, a computing device obtains a plurality of data items (step 1002). The computing device can be, for example, the location server 120 shown in FIG. 1. The plurality of data items can be obtained, for example, from one or more mobile devices, such as the mobile device 110 shown in FIG. 1, among others.

Each data item includes an indication of a particular location, an indication that a wireless signal from a first access point was observed at that location, and an indication of a time at which the wireless signal from the first access point was observed at that location. For example, a mobile device can conduct one or more wireless surveys to probe an area for the presence of wireless access points. If the mobile device observes wireless signals from the first wireless access point, the mobile device can generate data item that represents the observation. The data item can include, for example, geographical coordinates describing the location in which the wireless survey was conducted, the identity of the first wireless access point that was observed (e.g., a MAC address or a CID of the observed wireless access point), and a time stamp indicating when the wireless survey was conducted. Multiple data items (e.g., representing multiple different observations) can be obtained and aggregated for each wireless access point.

The computing device determines a locational stability of the first access point based on the data items (step 1004). This can include clustering the plurality of data items into one or more clusters based on the locations indicated in the plurality of data items. In some cases, clustering can be performed using the DBSCAN technique with respect to at least a subset of data items of the plurality of data items. In some cases, the subset of data items can be selected by binning each of the data items with respect to a binned geographical grid, and selecting, as the subset of data items, a pre-defined number of data items from each bin of the binned graphical grid. As an example, the technique shown and described with respect to FIGS. 9A-9D can be used to select data items to be input into a DBSCAN technique.

To determine a locational stability of the first access point, the computing device can determine whether the N most recent data items are associated with a common cluster, and determine whether a time span between the N most recent data items exceeds a threshold period of time. In some cases, if the N most recent data items are associated with the common cluster and if the time span between the N most recent data items exceeds the threshold period of time, a determination can be made that the first access point is stable. Further, if the N most recent data items are not associated with a common cluster and/or that the time span between the N most recent data items does not exceed the threshold period of time, a determination can be made that the first access point is unstable. In some cases, N can be determined based on an access point density of a geographical region of the first access point. In some cases, the threshold period of time can be determined based on an access point density of a geographical region of the first access point. In some cases, N and/or the threshold period of time can differ based on how often the wireless access point is observed (e.g., a frequency at which the wireless access point has been observed by one or more mobile devices in the past), and/or how often the wireless access point has moved in the past.

The computing device receives, from a mobile device, a request for a location of the mobile device (step 1006). The request can include an indication that a wireless signal from the first access point was observed by the mobile device. As an example, the request can be received from the mobile device 110 shown in FIG. 1.

If the first access point is determined to be stable, responsive to the request, the computing device provides a location of the common cluster as the location of the mobile device (step 1008).

If the first access point is determined to be unstable, a location of the first access point is withheld from the mobile device (step 1010)

In some cases, two or more clusters can be merged. Merging two or more clusters can include determining that a time span associated with the data items of a first cluster overlaps with a time span associated with the data items of a second cluster, and determining that a distance between a center of the first cluster and a center of the second cluster is less than a threshold distance. Responsive to determining that the time span associated with the data items of the first cluster overlap with the time span associated with the data items of the second cluster and determining that the distance between the center of the first cluster and the center of the second cluster is less than the threshold distance, the first cluster and the second cluster are merged. In some cases, the threshold distance can be determined based on a maximum reach of the first cluster. The first cluster can be associated with a greater number of data items than the second cluster.

In some cases, the plurality of data items can be filtered. For example, the data items can be filtered to remove spurious or errant data (e.g., "noisy" data) that may negatively impact the accuracy of the determined location.

Example Device Architecture

Figure 11:
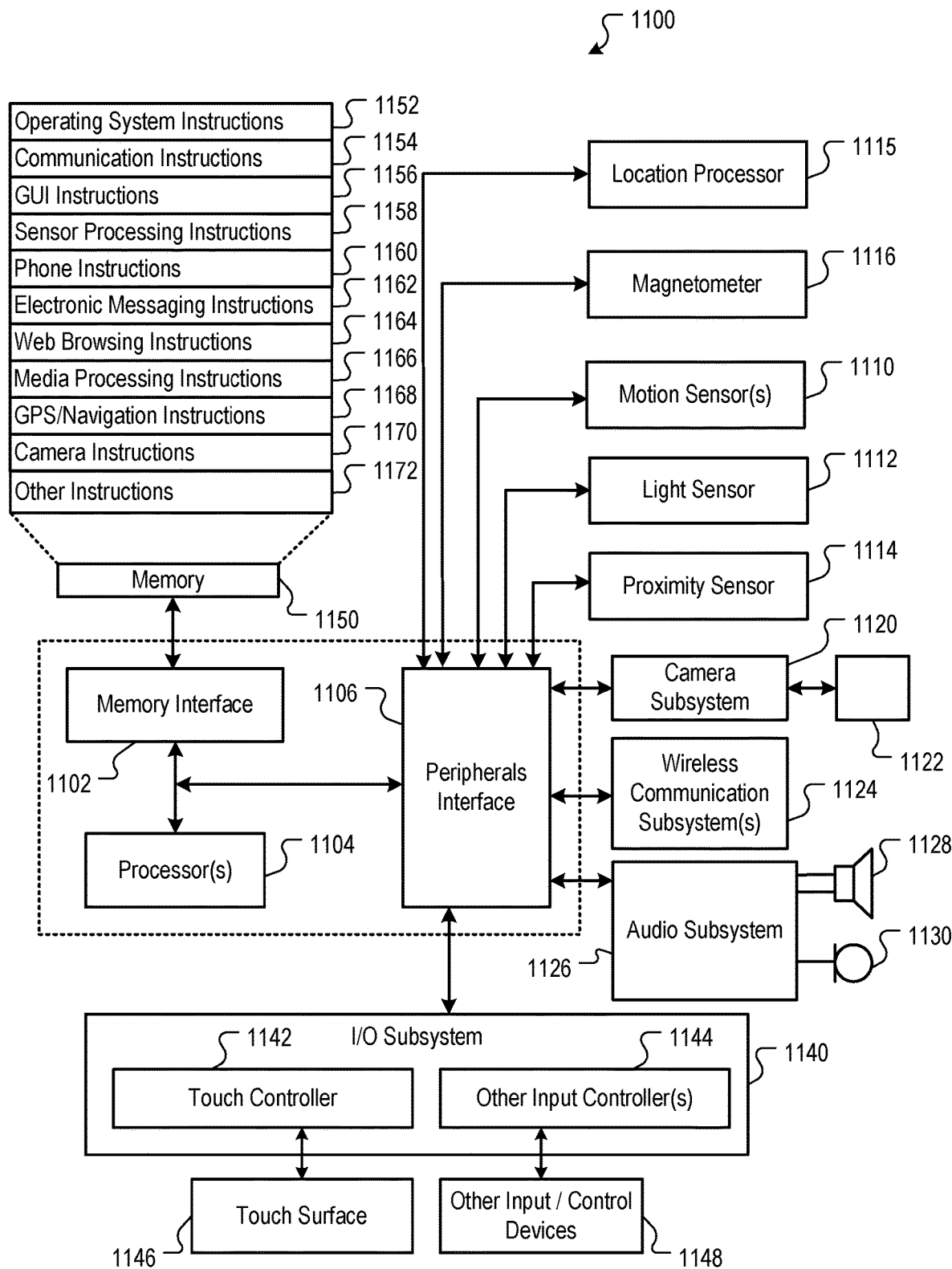
FIG. 11 is a diagram of an example device architecture.

FIG. 11 is a block diagram of an example device architecture 1100 for implementing the features and processes described in reference to FIGS. 1-10. Architecture 1100 may be implemented in any device for generating the features described in reference to FIGS. 1-10, including but not limited to desktop computers, server computers, portable computers, smart phones, tablet computers, game consoles, wearable computers, set top boxes, media players, smart TVs, and the like. Architecture 1100 may include memory interface 1102, data processor(s), image processor(s) or central processing unit(s) 1104, and peripherals interface 1106. Memory interface 1102, processor(s) 1104 or peripherals interface 1106 may be separate components or may be integrated in one or more integrated circuits. One or more communication buses or signal lines may couple the various components.

Sensors, devices, and subsystems may be coupled to peripherals interface 1106 to facilitate multiple functionalities. For example, motion sensor 1110, light sensor 1112, and proximity sensor 1114 may be coupled to peripherals interface 1106 to facilitate orientation, lighting, and proximity functions of the device. For example, in some implementations, light sensor 1112 may be utilized to facilitate adjusting the brightness of touch surface 1146. In some implementations, motion sensor 1110 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 1106, such as a temperature sensor, a biometric sensor, or other sensing device, to facilitate related functionalities.

Location processor 1115 (e.g., GNSS receiver chip) may be connected to peripherals interface 1106 to provide georeferencing. Electronic magnetometer 1116 (e.g., an integrated circuit chip) may also be connected to peripherals interface 1106 to provide data that may be used to determine the direction of magnetic North. Thus, electronic magnetometer 1116 may be used as an electronic compass.

Camera subsystem 1120 and an optical sensor 1122, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 1124. Communication subsystem(s) 1124 may include one or more wireless communication subsystems. Wireless communication subsystems 1124 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 1124 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 1124 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 1126 may be coupled to a speaker 1128 and one or more microphones 1130 to facilitate voice-enabled functions, such as voice recognition, voice replication, digital recording, and telephony functions.

I/O subsystem 1140 may include touch controller 1142 and/or other input controller(s) 1144. Touch controller 1142 may be coupled to a touch surface 1146. Touch surface 1146 and touch controller 1142 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1146. In one implementation, touch surface 1146 may display virtual or soft buttons and a virtual keyboard, which may be used as an input/output device by the user.

Other input controller(s) 1144 may be coupled to other input/control devices 1148, such as one or more buttons, rocker switches, thumb-wheel, infrared port, USB port, and/or a pointer device such as a stylus. The one or more buttons (not shown) may include an up/down button for volume control of speaker 1128 and/or microphone 1130.

In some implementations, device architecture 1100 may present recorded audio and/or video files, such as MP3, AAC, and MPEG video files. In some implementations, architecture 1100 may include the functionality of an MP3 player and may include a pin connector for tethering to other devices. Other input/output and control devices may be used.

Memory interface 1102 may be coupled to memory 1150. Memory 1150 may include high-speed random access memory or non-volatile memory, such as one or more magnetic disk storage devices, one or more optical storage devices, or flash memory (e.g., NAND, NOR). Memory 1150 may store operating system 1152, such as Darwin, RTXC, LINUX, UNIX, OS X, WINDOWS, or an embedded operating system such as VxWorks. Operating system 1152 may include instructions for handling basic system services and for performing hardware dependent tasks. In some implementations, operating system 1152 may include a kernel (e.g., UNIX kernel).

Memory 1150 may also store communication instructions 1154 to facilitate communicating with one or more additional devices, one or more computers or servers, including peer-to-peer communications. Communication instructions 1154 may also be used to select an operational mode or communication medium for use by the device, based on a geographic location (obtained by the GPS/Navigation instructions 1168) of the device. Memory 1150 may include graphical user interface instructions 1156 to facilitate graphic user interface processing, including a touch model for interpreting touch inputs and gestures; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GPS/Navigation instructions 1168 to facilitate GPS and navigation-related processes; camera instructions 1170 to facilitate camera-related processes and functions; and other instructions 1172 for performing some or all of the processes, as described in reference to FIGS. 1-10.

Each of the above identified instructions and applications may correspond to a set of instructions for performing one or more functions described above. These instructions need not be implemented as separate software programs, procedures, or modules. Memory 1150 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer.

Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
obtaining, at a computing device, a plurality of data items, wherein each data item comprises:
an indication of a particular location,
an indication that a wireless signal from a first access point was observed at that location, and
an indication of a time at which the wireless signal from the first access point was observed at that location; and
determining, using the computing device, a locational stability of the first access point based on the data items, wherein determining the locational stability of the first access point comprises:
clustering the plurality of data items into one or more clusters based on the locations indicated in the plurality of data items,
determining parameters for determining the locational stability of the first access point, wherein the parameters comprise a value of N and a threshold period of time, wherein determining the parameters comprises varying at least one of the value of N or the threshold period of time based on an access point density of a geographical region of the first access point, wherein N is a positive value, and wherein the threshold period of time is at least one minute, and
determining the locational stability of the first access point based on the parameters, wherein determining the locational stability of the first access point based on parameters comprises:
determining whether the N most recent data items are associated with a common cluster, and
determining whether a time span between the N most recent data items exceeds the threshold period of time.

2. The method of claim 1, further comprising:
determining, using the computing device, that the first access point is stable;
receiving, from a mobile device, a request for a location of the mobile device, wherein the request comprises an indication that a wireless signal from the first access point was observed by the mobile device;
responsive to the request and upon determining that the first access point is stable, providing, to the mobile device, a location of the common cluster as the location of the mobile device.

3. The method of claim 1, further comprising:
determining, using the computing device, that the first access point is unstable;
receiving, from a mobile device, a request for a location of the mobile device, wherein the request comprises an indication that a wireless signal from the first access point was observed by the mobile device;
upon determining that the first access point is unstable, withholding a location of the first access point from the mobile device.

4. The method of claim 1, wherein determining the locational stability of the first access point further comprises:
determining that the N most recent data items are associated with the common cluster and that the time span between the N most recent data items exceeds the threshold period of time, and
responsive to determining that the N most recent data items are associated with the common cluster and that the time span between the N most recent data items exceeds the threshold period of time, determining that the first access point is stable.

5. The method of claim 4, wherein at least one of the value of N or the threshold period of time is determined based on a frequency at which the wireless access point has been observed, or a number of times that the wireless access point has moved in the past.

6. The method of claim 1, wherein determining the locational stability of the first access point further comprises:
determining that the N most recent data items are not associated with a common cluster and/or that the time span between the N most recent data items does not exceed the threshold period of time, and
responsive to determining that the N most recent data items are not associated with a common cluster and/or that the time span between the N most recent data items does not exceed the threshold period of time, determining that the first access point is unstable.

7. The method of claim 1, further comprising merging two or more clusters, wherein merging two or more clusters comprises:
determining that a time span associated with the data items of a first cluster overlaps with a time span associated with the data items of a second cluster;
determining that a distance between a center of the first cluster and a center of the second cluster is less than a threshold distance; and
responsive to determining that the time span associated with the data items of the first cluster overlap with the time span associated with the data items of the second cluster and determining that the distance between the center of the first cluster and the center of the second cluster is less than the threshold distance, merging the first cluster and the second cluster.

8. The method of claim 7, wherein the threshold distance is determined based on a maximum reach of the first cluster, and wherein the first cluster is associated with a greater number of data items than the second cluster.

9. The method of claim 1, further comprising filtering the plurality of data items.

10. The method of claim 1, wherein clustering the plurality of data items into one or more clusters comprises performing a density-based spatial clustering of applications with noise (DBSCAN) process with respect to at least a subset of data items of the plurality of data items.

11. The method of claim 1, wherein clustering the plurality of data items into one or more clusters comprises performing a DBSCAN process with respect to a subset of data of the plurality of data items, wherein the subset of data items is selected by:
binning each of the data items with respect to a binned geographical grid, and
selecting, as the subset of data items, a pre-defined number of data items from each bin of the binned graphical grid.

12. The method of claim 1, wherein each data item comprises a media access control (MAC) address of the first access point.

13. The method of claim 1, wherein the geographical region of the first access point is associated with a plurality of clusters of data items.

14. A non-transitory computer-readable medium including one or more sequences of instructions which, when executed by one or more processors, causes:
obtaining a plurality of data items, wherein each data item comprises:

an indication of a particular location,
an indication that a wireless signal from a first access point was observed at that location, and
an indication of a time at which the wireless signal from the first access point was observed at that location; and
determining, based on the data items, a locational stability of the first access point, wherein determining the locational stability of the first access point comprises:
clustering the plurality of data items into one or more clusters,
determining parameters for determining the locational stability of the first access point, wherein the parameters comprise a value of N and a threshold period of time, wherein determining the parameters comprises varying at least one of the value of N or the threshold period of time based on an access point density of a geographical region of the first access point, wherein N is a positive value, and wherein the threshold period of time is at least one minute, and
determining the locational stability of the first access point based on the parameters, wherein determining the locational stability of the first access point based on parameters comprises:
determining whether the N most recent data items are associated with a common cluster, and
determining whether a time span between the N most recent data items exceeds the threshold period of time.

15. The non-transitory computer-readable medium of claim 14, wherein the one or more sequences of instructions, when executed by one or more processors, further causes:
determining, using the computing device, that the first access point is stable;
receiving, from a mobile device, a request for a location of the mobile device, wherein the request comprises an indication that a wireless signal from the first access point was observed by the mobile device;
responsive to the request and upon determining that the first access point is stable, providing, to the mobile device, a location of the common cluster as the location of the mobile device.

16. The non-transitory computer-readable medium of claim 14, wherein the one or more sequences of instructions, when executed by one or more processors, further causes:
determining, using the computing device, that the first access point is unstable;
receiving, from a mobile device, a request for a location of the mobile device, wherein the request comprises an indication that a wireless signal from the first access point was observed by the mobile device;
upon determining that the first access point is unstable, withholding a location of the first access point from the mobile device.

17. The non-transitory computer-readable medium of claim 14, wherein determining the locational stability of the first access point further comprises:
determining that the N most recent data items are associated with the common cluster and that the time span between the N most recent data items exceeds the threshold period of time, and
responsive to determining that the N most recent data items are associated with the common cluster and that the time span between the N most recent data items exceeds the threshold period of time, determining that the first access point is stable.

18. The non-transitory computer-readable medium of claim 17, wherein at least one of the value of N or the threshold period of time is determined based on a frequency at which the wireless access point has been observed, or a number of times that the wireless access point has moved in the past.

19. The non-transitory computer-readable medium of claim 14, wherein determining the locational stability of the first access point further comprises:
determining that the N most recent data items are not associated with a common cluster and/or that the time span between the N most recent data items does not exceed the threshold period of time, and
responsive to determining that the N most recent data items are not associated with a common cluster and/or that the time span between the N most recent data items does not exceed the threshold period of time, determining that the first access point is unstable.

20. The non-transitory computer-readable medium of claim 14, wherein the one or more sequences of instructions, when executed by one or more processors, further causes:
merging two or more clusters, wherein merging two or more clusters comprises:
determining that a time span associated with the data items of a first cluster overlaps with a time span associated with the data items of a second cluster;
determining that a distance between a center of the first cluster and a center of the second cluster is less than a threshold distance; and
responsive to determining that the time span associated with the data items of the first cluster overlap with the time span associated with the data items of the second cluster and determining that the distance between the center of the first cluster and the center of the second cluster is less than the threshold distance, merging the first cluster and the second cluster.

21. The non-transitory computer-readable medium of claim 20, wherein the threshold distance is determined based on a maximum reach of the first cluster, and wherein the first cluster is associated with a greater number of data items than the second cluster.

22. The non-transitory computer-readable medium of claim 14, wherein the one or more sequences of instructions, when executed by one or more processors, further causes:
filtering the plurality of data items.

23. The non-transitory computer-readable medium of claim 14, wherein clustering the plurality of data items into one or more clusters comprises performing a density-based spatial clustering of applications with noise (DBSCAN) process with respect to at least a subset of data items of the plurality of data items.

24. The non-transitory computer-readable medium of claim 14, wherein clustering the plurality of data items into one or more clusters comprises performing a DBSCAN process with respect to a subset of data items of the plurality of data items, wherein the subset of data items is selected by:
binning each of the data items with respect to a binned geographical grid, and
selecting, as the subset of data items, a pre-defined number of data items from each bin of the binned graphical grid.

25. The non-transitory computer-readable medium of claim 14, wherein each data item comprises a media access control (MAC) address of the first access point.

26. A system comprising:
one or more processors;
non-transitory computer-readable medium including one or more sequences of instructions which, when executed by one or more processors, causes:

obtaining, by the one or more processors a plurality of data items from one or more communications devices, wherein each data item comprises:
  an indication of a particular location of a respective communications device,
  an indication that a wireless signal from a first access point was observed at that location using a transceiver of the respective communications device, and
  an indication of a time at which the wireless signal from the first access point was observed at that location using the transceiver of the respective communications device; and
determining, by the one or more processors based on the data items, a locational stability of the first access point, wherein determining the locational stability of the first access point comprises:
  clustering the plurality of data items into one or more clusters,
  determining parameters for determining the locational stability of the first access point, wherein the parameters comprise a value of N and a threshold period of time, wherein determining the parameters comprises varying at least one of the value of N or the threshold period of time based on an access point density of a geographical region of the first access point, wherein N is a positive value, and wherein the threshold period of time is at least one minute, and
  determining the locational stability of the first access point based on the parameters, wherein determining the locational stability of the first access point based on parameters comprises:
  determining whether the N most recent data items are associated with a common cluster, and
  determining whether a time span between the N most recent data items exceeds the threshold period of time.

27. The system of claim 26, wherein the one or more sequences of instructions, when executed by one or more processors, further causes:
  determining, using the computing device, that the first access point is stable;
  receiving, from a mobile device, a request for a location of the mobile device, wherein the request comprises an indication that a wireless signal from the first access point was observed by the mobile device;
  responsive to the request and upon determining that the first access point is stable, providing, to the mobile device, a location of the common cluster as the location of the mobile device.

28. The system of claim 26, wherein the one or more sequences of instructions, when executed by one or more processors, further causes:
  determining, using the computing device, that the first access point is unstable;
  receiving, from a mobile device, a request for a location of the mobile device, wherein the request comprises an indication that a wireless signal from the first access point was observed by the mobile device;
  upon determining that the first access point is unstable, withholding a location of the first access point from the mobile device.

29. The system of claim 26, wherein determining the locational stability of the first access point further comprises:
  determining that the N most recent data items are associated with the common cluster and that the time span between the N most recent data items exceeds the threshold period of time, and
  responsive to determining that the N most recent data items are associated with the common cluster and that the time span between the N most recent data items exceeds the threshold period of time, determining that the first access point is stable.

30. The system of claim 29, wherein at least one of the value of N or the threshold period of time is determined based on a frequency at which the wireless access point has been observed, or a number of times that the wireless access point has moved in the past.

31. The system of claim 26, wherein determining the locational stability of the first access point further comprises:
  determining that the N most recent data items are not associated with a common cluster and/or that the time span between the N most recent data items does not exceed the threshold period of time, and
  responsive to determining that the N most recent data items are not associated with a common cluster and/or that the time span between the N most recent data items does not exceed the threshold period of time, determining that the first access point is unstable.

32. The system of claim 26, wherein the one or more sequences of instructions, when executed by one or more processors, further causes:
  merging two or more clusters, wherein merging two or more clusters comprises:
    determining that a time span associated with the data items of a first cluster overlaps with a time span associated with the data items of a second cluster;
    determining that a distance between a center of the first cluster and a center of the second cluster is less than a threshold distance; and
    responsive to determining that the time span associated with the data items of the first cluster overlap with the time span associated with the data items of the second cluster and determining that the distance between the center of the first cluster and the center of the second cluster is less than the threshold distance, merging the first cluster and the second cluster.

33. The system of claim 32, wherein the threshold distance is determined based on a maximum reach of the first cluster, and wherein the first cluster is associated with a greater number of data items than the second cluster.

34. The system of claim 26, wherein the one or more sequences of instructions, when executed by one or more processors, further causes:
  filtering the plurality of data items.

35. The system of claim 26, wherein clustering the plurality of data items into one or more clusters comprises performing a density-based spatial clustering of applications with noise (DBSCAN) process with respect to at least a subset of data items of the plurality of data items.

36. The system of claim 26, wherein clustering the plurality of data items into one or more clusters comprises performing a DBSCAN process with respect to a subset of data items of the plurality of data items, wherein the subset of data items is selected by:
  binning each of the data items with respect to a binned geographical grid, and
  selecting, as the subset of data items, a pre-defined number of data items from each bin of the binned graphical grid.

37. The system of claim 26, wherein each data item comprises a media access control (MAC) address of the first access point.

* * * * *